United States Patent
Chaves et al.

(10) Patent No.: US 11,483,060 B2
(45) Date of Patent: Oct. 25, 2022

(54) SOLUTIONS FOR UAV COMMUNICATIONS IN A NETWORK WITH RECEIVER-ONLY MMWAVE 5G BS ANTENNAS AND IN OTHER NETWORKS

(71) Applicant: Nokia Solutions and Networks Oy, Espoo (FI)

(72) Inventors: Fabiano de Sousa Chaves, Morris Plains, NJ (US); Harish Viswanathan, Morristown, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/296,779

(22) PCT Filed: Nov. 29, 2018

(86) PCT No.: PCT/US2018/063041
§ 371 (c)(1),
(2) Date: May 25, 2021

(87) PCT Pub. No.: WO2020/112111
PCT Pub. Date: Jun. 4, 2020

(65) Prior Publication Data
US 2022/0029696 A1   Jan. 27, 2022

(51) Int. Cl.
*H04B 7/06*   (2006.01)
*H04B 7/185*   (2006.01)
*H04B 7/08*   (2006.01)

(52) U.S. Cl.
CPC ....... *H04B 7/18504* (2013.01); *H04B 7/0695* (2013.01); *H04B 7/088* (2013.01)

(58) Field of Classification Search
CPC ... H04B 7/18504; H04B 7/0695; H04B 7/088
See application file for complete search history.

(56) References Cited

U.S. PATENT DOCUMENTS

| | | | |
|---|---|---|---|
| 10,348,394 B1* | 7/2019 | Bakr | ......................... H04L 5/14 |
| 10,536,955 B2 | 1/2020 | Gholmieh et al. | |
| 10,897,083 B2 | 1/2021 | Tran et al. | |
| 2015/0237569 A1* | 8/2015 | Jalali | ..................... H04W 24/02 370/326 |

(Continued)

FOREIGN PATENT DOCUMENTS

| CN | 108039927 A | 5/2018 |
|---|---|---|
| WO | WO-2018/083551 A1 | 5/2018 |
| WO | WO-2018130130 A1 | 7/2018 |

OTHER PUBLICATIONS

3GPP TSG RAN WG1#88, Athens, Greece Feb. 13-17, 2017, R1-1702935, "Beam management for Multi-TRP operation", Samsung, 4 pgs.

(Continued)

*Primary Examiner* — Kenneth T Lam
(74) *Attorney, Agent, or Firm* — Harrington & Smith

(57) ABSTRACT

Spatial and antenna information of a UAV is determined. Using at least the spatial and antenna information, a set of candidate transmission-reception beam pairs is determined, each pair between one of a set of one or more antenna panels in the UAV and one of multiple TRPs, wherein one or more of the multiple TRPs includes a receiver-only antenna panel that is oriented upward. Beam sweeping is configured to be performed for the set of candidate transmission-reception beam pairs. Based on results of the beam sweeping, a transmission-reception beam pair of the set of candidate transmission-reception beam pairs is selected to be used for uplink communication(s) from the UAV to a determined TRP in the determined best transmission-reception beam pair. The UAV may send the spatial and antenna information toward a wireless communication network including the multiple TRPs, and may send this periodically or based on thresholds.

22 Claims, 14 Drawing Sheets

(56) References Cited

U.S. PATENT DOCUMENTS

| | | | |
|---|---|---|---|
| 2017/0223749 A1* | 8/2017 | Sheldon | H04B 7/0617 |
| 2018/0097559 A1 | 4/2018 | Jalali | 72/46 |
| 2018/0115065 A1 | 4/2018 | Valdes Garcia et al. | 21/24 |
| 2018/0152909 A1* | 5/2018 | Hanes | H04W 4/40 |
| 2018/0199212 A1 | 7/2018 | Lin et al. | |
| 2018/0331739 A1* | 11/2018 | Nilsson | H04B 7/0417 |

OTHER PUBLICATIONS

3GPP TSG RAN WG1 #88, Athens, Greece Feb. 13-17, 2017, R1-=1703133, "Joint DL/UL beam management operation for NR", Sony, 4 pgs.

3GPP TSG-RAN WG1 Meeting #90, Prague, P.R. Czech Aug. 21-25, 2017, R1-1712551, "Details for UL Beam Management", Intel Corporation, 8 pgs.

3GPP TSG RAN WG1 Meeting #95, Spokane, USA, Nov. 12-16, 2018, R1-1813240, "on Multi-Beam Operation Enhancements", InterDigital, Inc., 4 pgs.

Gonzalez-Jorge, Higinio, et al., "Unmanned Aerial Systems for Civil Applications: A Review", MDPI Drones 2017, 19 pgs.

Shakhatreh, Hazim, et al., "Unmanned Aerial Vehicles: a Survey on Civil Applications and Key Research Challenges", Apr. 19, 2018, 58 pgs.

Geraci, Giovanni, et al., "Understanding UAV Cellular Communications: From Existing Networks to Massive MIMO", Apr. 20, 2018, 11 pgs.

Nguyen, Huan Cong, et al., "How to Ensure Reliable Connectivity for Aerial Vehicles Over Cellular Networks", © 2018 IEEE, 14 pgs.

3GPP TR 36.777 V1.0.0 (Dec. 2017), "$3^{rd}$ Generation Partnership Project; Technical specification Group /radio Access Network; Study on Enhanced LTE Support for Aerial Vehicles (Release 15)", 93 pgs.

* cited by examiner

TABLE 1: REQUIREMENTS FOR AERIAL VEHICLES CONNECTIVITY SERVICES

| ITEMS | VALUE |
|---|---|
| DATA TYPE | 1. C&C:<br>THIS INCLUDES TELEMETRY, WAYPOINT UPDATE FOR AUTONOMOUS UAV OPERATION, REAL TIME PILOTING, IDENTITY, FLIGHT AUTHORIZATION, NAVIGATION DATABASE UPDATE, etc.<br>2. APPLICATION DATA:<br>THIS INCLUDES VIDEO (STREAMING), IMAGES, OTHER SENSORS DATA, etc. |
| LATENCY | 1. C&C: 50ms (ONE WAY FROM eNB TO UAV)<br>2. APPLICATION DATA: SIMILAR TO LTE UE (TERRESTRIAL USER) |
| DL/UL DATA RATE | 1. C&C: 60-100 kbps FOR UL/DL<br>2. APPLICATION DATA: UP TO 50 Mbps FOR UL |
| C&C RELIABILITY | UP TO $10^{-3}$ PACKET ERROR LOSS RATE |

FIG.2

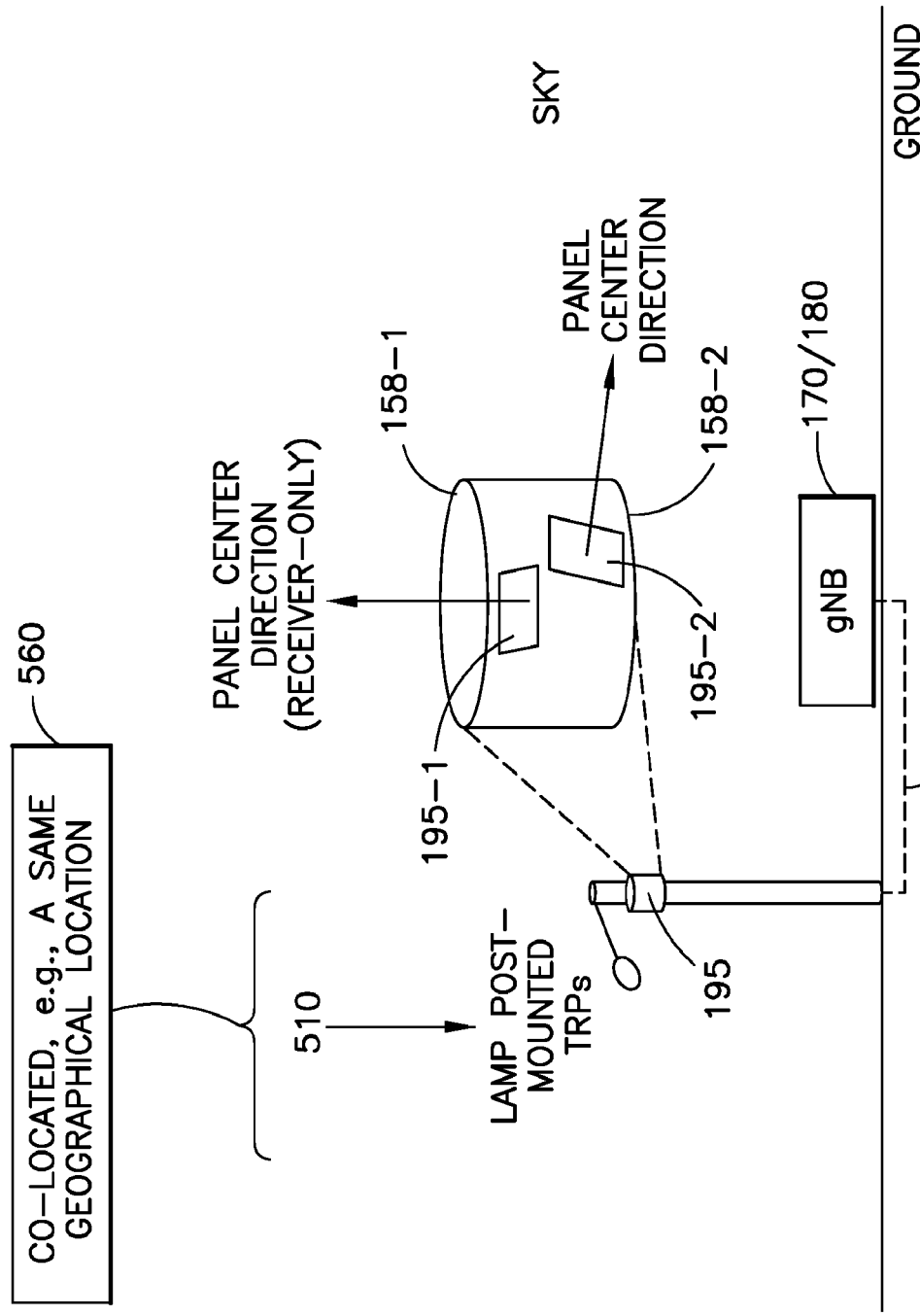

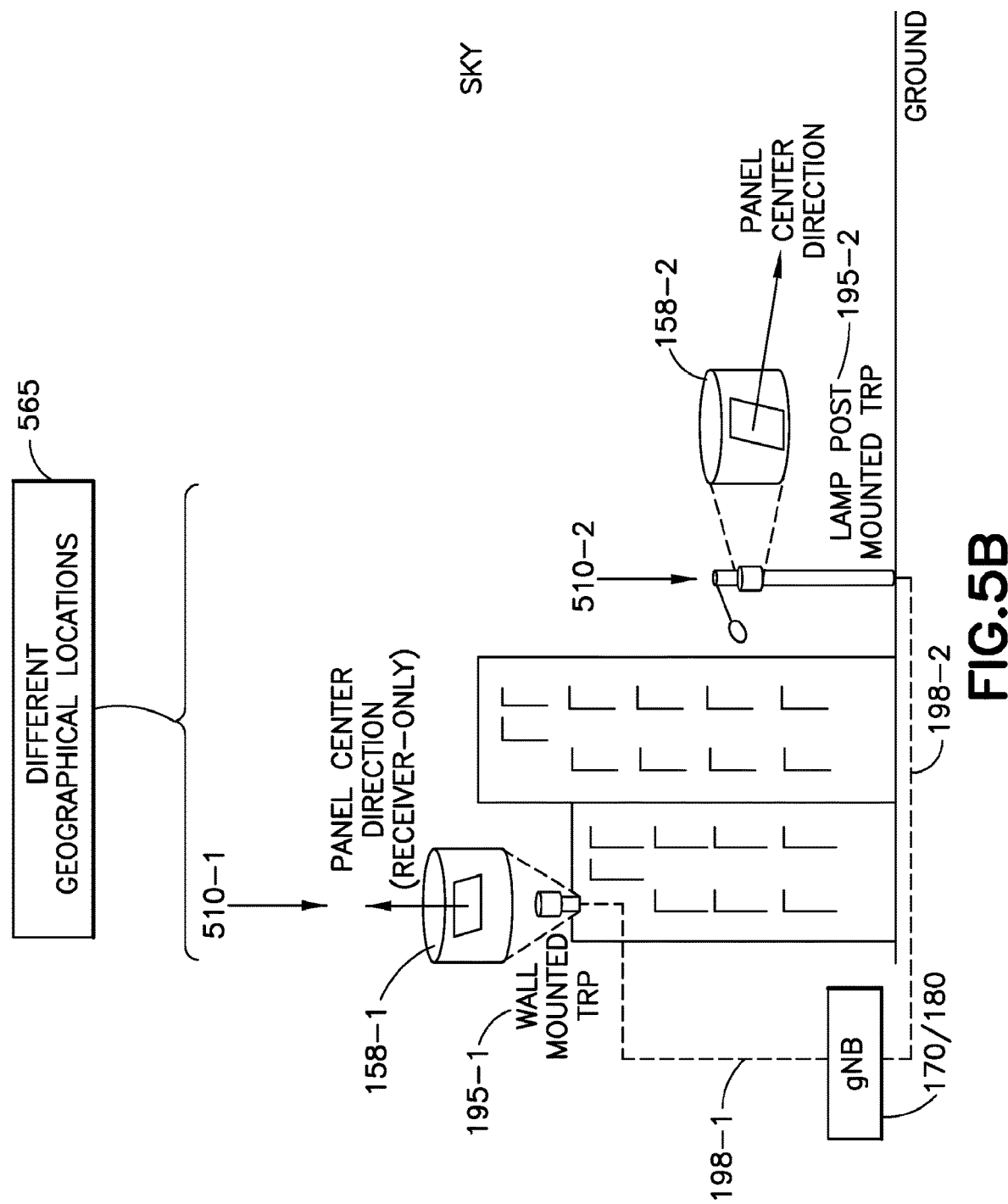

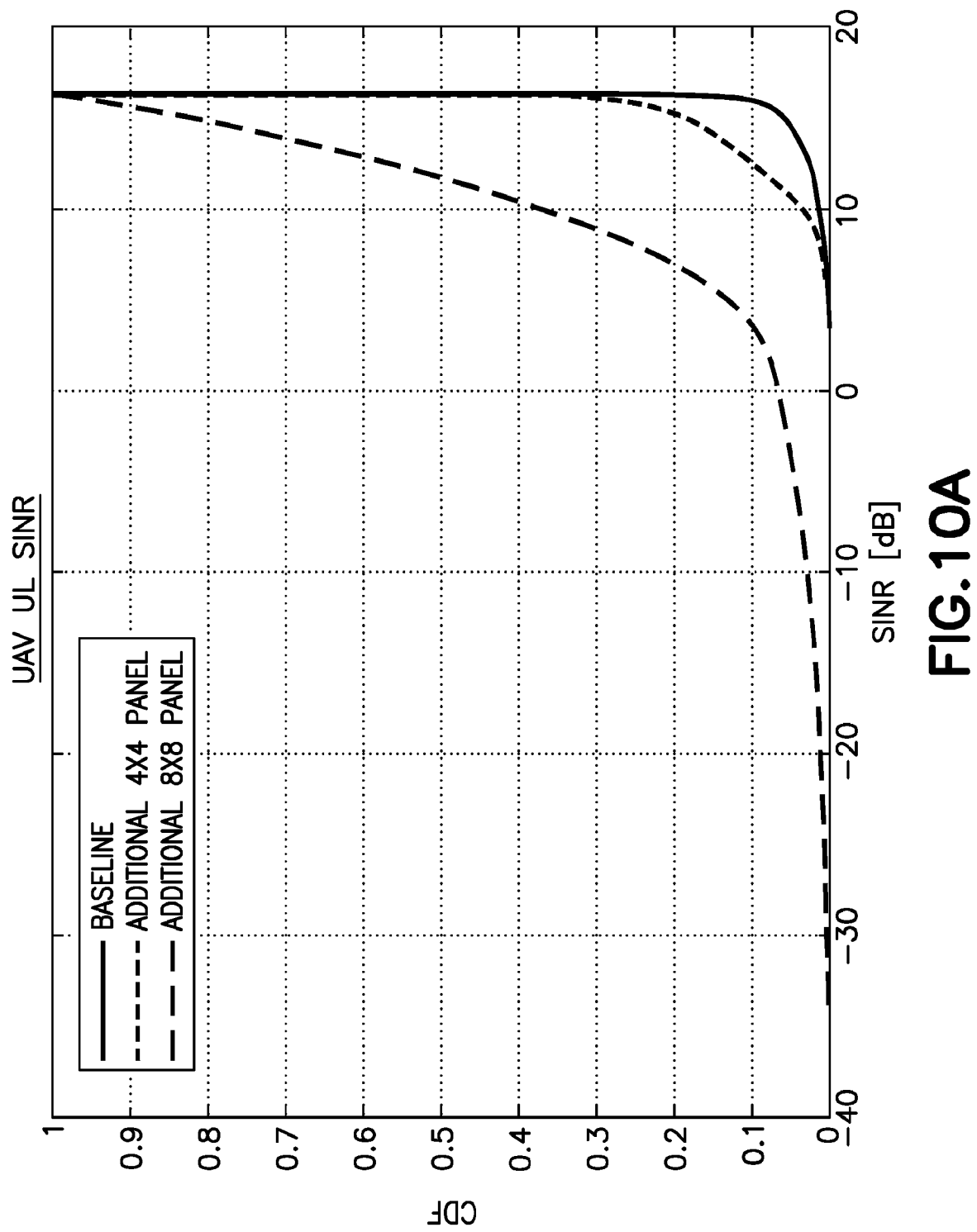

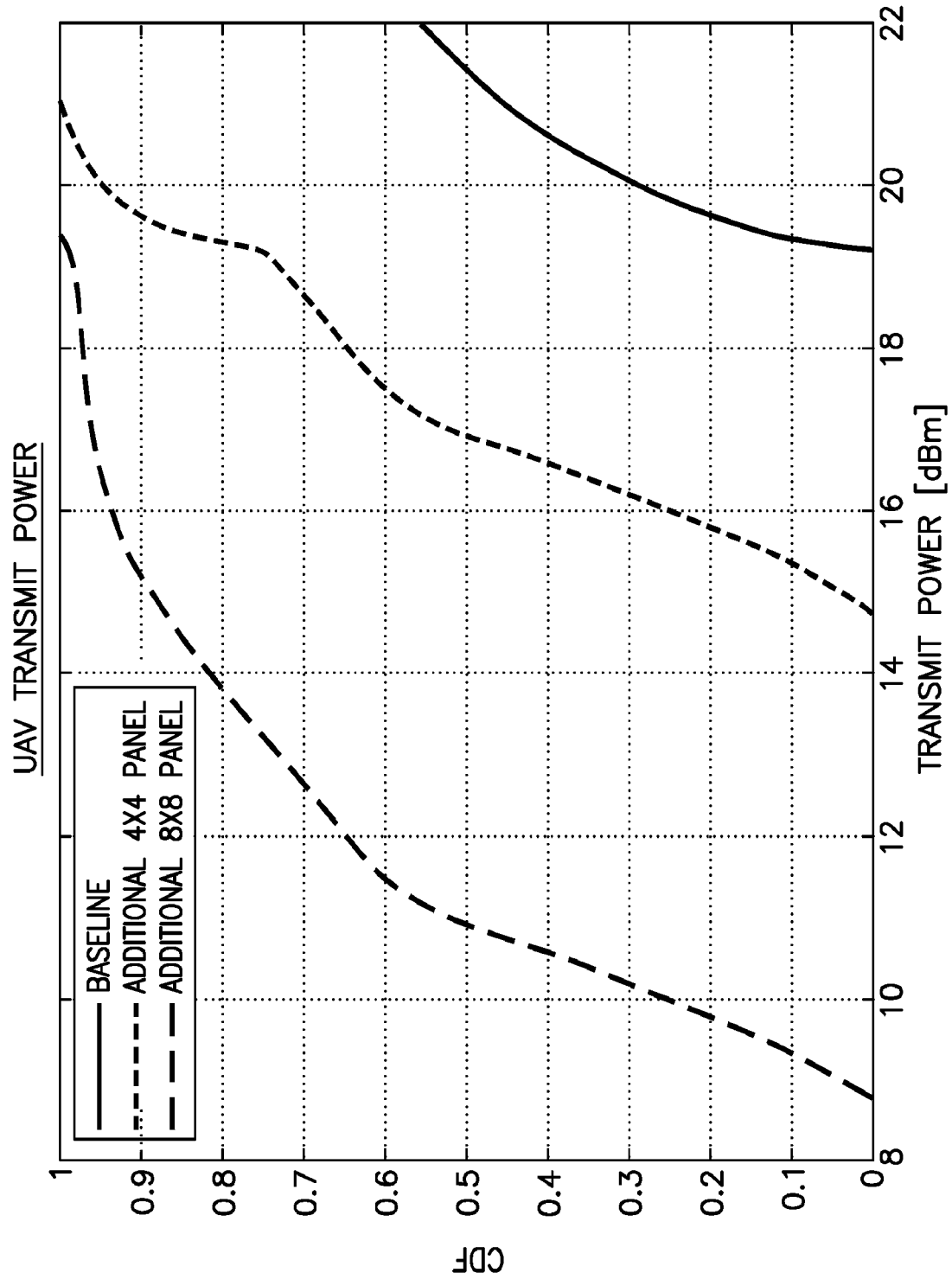

SOLUTIONS FOR UAV COMMUNICATIONS IN A NETWORK WITH RECEIVER-ONLY MMWAVE 5G BS ANTENNAS AND IN OTHER NETWORKS

CROSS REFERENCE TO RELATED APPLICATION

This patent application is a U.S. National Stage application of International Patent Application Number PCT/US2018/063041 filed Nov. 29, 2018, which is hereby incorporated by reference in its entirety.

TECHNICAL FIELD

This invention relates generally to wireless communications and, more specifically, relates to wireless communications for unmanned aerial vehicles (UAVs) and using base station (BSs) from wireless networks to communicate with the UAVs.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

The market for unmanned aerial vehicles (UAVs) (also called drones) is growing, and new use cases are in continuous development. UAVs are used to streamline operations, to reduce risk and improve efficiency, becoming very useful for inspection tasks (e.g. in agriculture or pipe-line), package delivery and disaster-relief applications. See, e.g., Hazim Shakhatre, et al., "Unmanned Aerial Vehicles: A Survey on Civil Applications and Key Research Challenges", arXiv:1805.00881v1 [cs.RO] 19 Apr. 2018; or Higinio González-Jorge, et al., "Unmanned Aerial Systems for Civil Applications: A Review", Drones 2017, 1, 2; doi:10.3390/drones1010002.

Current regulations in most countries limit drone operations to cases in which there is Visual Line of Sight (VLOS) between an UAV and its pilot. However, it is expected that Beyond Visual Line of Sight (BVLOS) operations will be allowed for extended flight range, provided there is a reliable Command and Control (C&C) link to the drone. See, e.g., the following: H. C. Nguyen, R. Amorim, J. Wigard, I. Z. Kovacs, T. B. Sorensen, P. Mogensen, "How to Ensure Reliable Connectivity for Aerial Vehicles Over Cellular Networks", IEEE Access, 2018; and G. Geraci, A. Garcia-Rodriguez, L. G. Giordano, D. Lopez-Perez, E. Bjornson, "Understanding UAV Cellular Communications: From Existing Networks to Massive MIMO", arXiv: 1804.08489v1 {cs.IT} 20 Apr. 2018.

Third generation partnership project (3GPP) studies on enhanced Long Term Evolution (LTE) support for UAVs have been reported in 3GPP TR 36.777 (see 3GPP TR 36.777, "Study on enhanced LTE support for aerial vehicles (Release 15)," December 2017), where UAV heights and speeds of up to 300 m and 160 km/h, respectively, are considered. One issue with UAVs and wireless networks such as for LTE (or NG, new generation, also referred to as 5G, fifth generation) is that these wireless communication networks are typically designed for ground-based mobile devices (commonly referred to as User Equipment, UEs). The designs of these wireless networks generally do not consider mobile devices that are above the level of the base stations being used to communicate with the UEs.

BRIEF SUMMARY

This section is intended to include examples and is not intended to be limiting.

In an exemplary embodiment, a method is disclosed that includes determining spatial and antenna information of an unmanned aerial vehicle. The method includes determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward. The method includes configuring beam sweeping to be performed for the set of candidate transmission-reception beam pairs. The method includes determining, based on results of the beam sweeping, a transmission-reception beam pair of the set of candidate transmission-reception beam pairs to be used for one or more uplink communications from the unmanned aerial vehicle to a determined transmission-reception point in the determined best transmission-reception beam pair.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform at least the following: determining spatial and antenna information of an unmanned aerial vehicle; determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward; configuring beam sweeping to be performed for the set of candidate transmission-reception beam pairs; and determining, based on results of the beam sweeping, a transmission-reception beam pair of the set of candidate transmission-reception beam pairs to be used for one or more uplink communications from the unmanned aerial vehicle to a determined transmission-reception point in the determined best transmission-reception beam pair.

An exemplary computer program product includes a computer-readable storage medium bearing computer program code embodied therein for use with a computer. The computer program code includes: code for determining spatial and antenna information of an unmanned aerial vehicle; code for determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward; code for configuring beam sweeping to be performed for the set of candidate transmission-reception beam pairs; and code for determining, based on results of the beam sweeping, a transmission-reception beam pair of the set of candidate transmission-reception beam pairs to be used for one or more uplink communications from the unmanned aerial vehicle to a determined transmission-reception point in the determined best transmission-reception beam pair.

In another exemplary embodiment, an apparatus comprises: means for determining spatial and antenna information of an unmanned aerial vehicle; means for determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward; means for configuring beam sweeping to be performed for the set of candidate transmission-reception beam pairs; and means for determining, based on results of the beam sweeping, a transmission-reception beam pair of the set of candidate transmission-reception beam pairs to be used for one or more uplink communications from the unmanned aerial vehicle to a determined transmission-reception point in the determined best transmission-reception beam pair.

In an exemplary embodiment, a method is disclosed that includes sending, by an unmanned aerial vehicle, spatial and antenna information toward a wireless communication network comprising a plurality of transmission-reception points. The method includes receiving configuration information to configure beam sweeping to be performed for a set of candidate transmission-reception beam pairs, each pair between one of a set of one or more antenna panels in the unmanned aerial vehicle and one of a set of antenna panels in the plurality of transmission-reception points. The method includes performing the beam sweeping based on the received configuration information.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform at least the following: sending, by an unmanned aerial vehicle, spatial and antenna information toward a wireless communication network comprising a plurality of transmission-reception points; receiving configuration information to configure beam sweeping to be performed for a set of candidate transmission-reception beam pairs, each pair between one of a set of one or more antenna panels in the unmanned aerial vehicle and one of a set of antenna panels in the plurality of transmission-reception points; and performing the beam sweeping based on the received configuration information.

An exemplary computer program product includes a computer-readable storage medium bearing computer program code embodied therein for use with a computer. The computer program code includes: code for sending, by an unmanned aerial vehicle, spatial and antenna information toward a wireless communication network comprising a plurality of transmission-reception points; code for receiving configuration information to configure beam sweeping to be performed for a set of candidate transmission-reception beam pairs, each pair between one of a set of one or more antenna panels in the unmanned aerial vehicle and one of a set of antenna panels in the plurality of transmission-reception points; and code for performing the beam sweeping based on the received configuration information.

In another exemplary embodiment, an apparatus comprises: means for sending, by an unmanned aerial vehicle, spatial and antenna information toward a wireless communication network comprising a plurality of transmission-reception points; means for receiving configuration information to configure beam sweeping to be performed for a set of candidate transmission-reception beam pairs, each pair between one of a set of one or more antenna panels in the unmanned aerial vehicle and one of a set of antenna panels in the plurality of transmission-reception points; and means for performing the beam sweeping based on the received configuration information.

BRIEF DESCRIPTION OF THE DRAWINGS

In the attached Drawing Figures:

FIG. 2 is a table, referred to as Table 1 herein, of requirements for aerial vehicles connectivity services;

FIG. 5A illustrates an example where a set of TRPs, coupled to a gNB, are located at a same geographical location and contains both a receiver-only antenna panel and a regular antenna panel, in an exemplary embodiment;

FIG. 5B illustrates an example where two TRPs, coupled to a gNB, are separated into two different geographical locations with a TRP with a receiver-only antennal panel and a TRP with a regular antenna panel, in an exemplary embodiment;

FIG. 9A illustrates UAV UL SINR and FIG. 9B illustrates UAV transmit power; and FIGS. 10A and 10B illustrate benefits of upwards receiver-only 5G BS antenna array for UAVs at 300 m height, where FIG. 10A illustrates UAV UL SINR and FIG. 10B illustrates UAV transmit power.

DETAILED DESCRIPTION OF THE DRAWINGS

Figure 1:
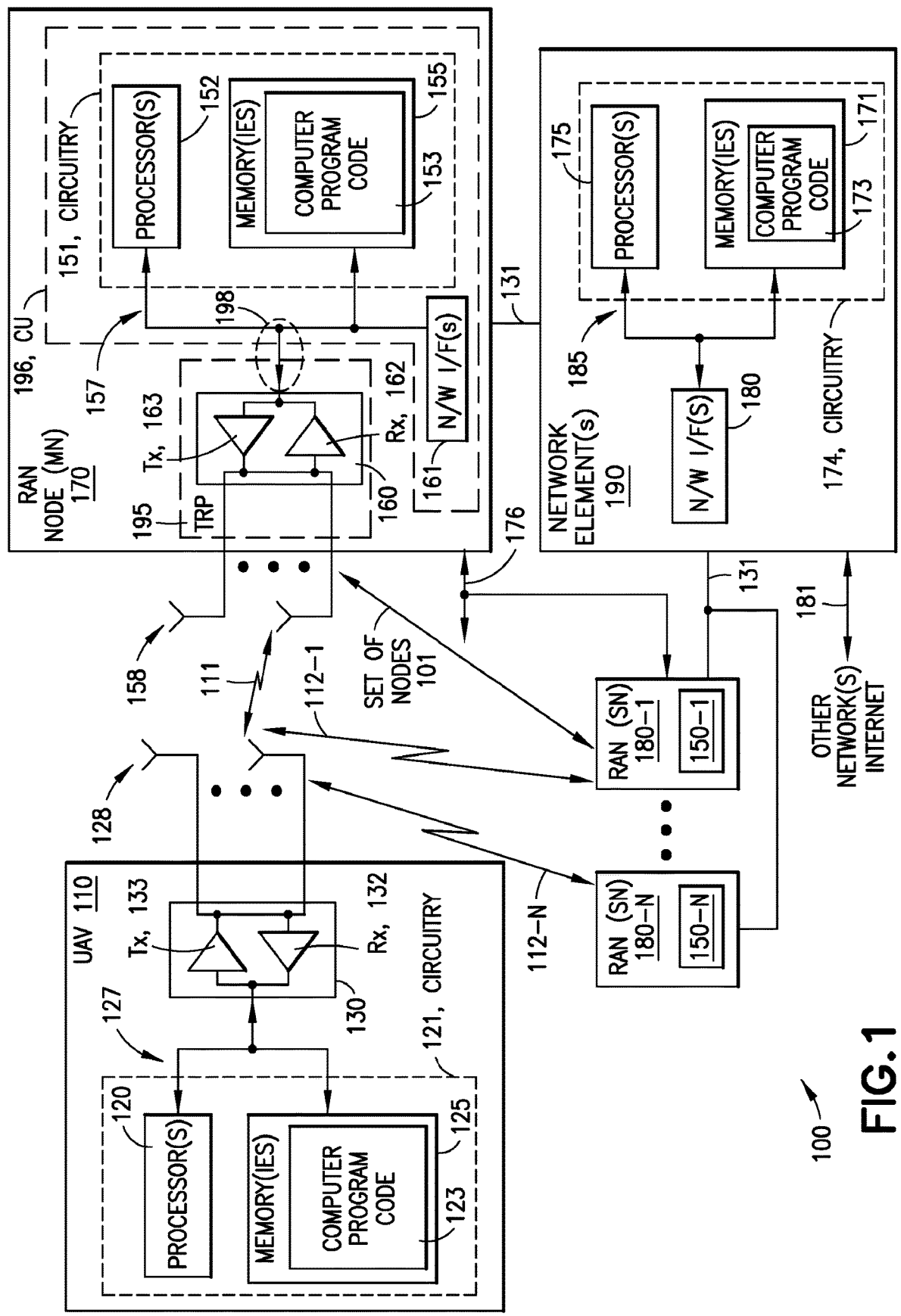
FIG. 1 is a block diagram of one possible and non-limiting exemplary system in which the exemplary embodiments may be practiced.

The following abbreviations that may be found in the specification and/or the drawing figures are defined as follows:

3D three dimensional
3GPP third generation partnership project
5G fifth generation
5GC 5G core network
AMF access and mobility management function
BVLOS beyond visual line of sight
BS base station
CA carrier aggregation
C&C command and control
CDF cumulative distribution function
CE control element
CU central unit
DC dual connectivity
DCI downlink control information
DL downlink
DU distributed unit
ECC Electronics Communications Committee
EESS Earth-Exploratory Satellite Service
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GPS global positioning system
I/F interface
INS Inertial Navigation System
ISD inter-site distance
L1/L2 Layer 1/Layer 2
LOS line of sight
LTE long term evolution
MAC medium access control
MME mobility management entity
mmWave millimeter wave
MN master node
ng or NG new generation
ng-eNB or NG-eNB new generation eNB
NSA non-standalone
NR new radio
N/W or NW network
PBCH physical broadcast channel
PCell primary cell
PDCCH physical downlink control channel
PDCP packet data convergence protocol
PHY physical layer
PRB physical resource block
PS Cell primary secondary cell
PSS Primary Synchronization Signal
PUCCH physical uplink control channel
PUSCH physical uplink shared channel
RAN radio access network
Rel release
RLC radio link control
RRH remote radio head
RRC radio resource control
RU radio unit
Rx receiver
SA standalone
SCell secondary cell
SDAP service data adaptation protocol
SFN subframe number
SCG secondary cell group
SGW serving gateway
SINR signal-to-interference-plus-noise ratio
SMF session management function
SN secondary node
SPCell secondary primary cell
SRS Sounding Reference Signal
SSS Secondary Synchronization Sequence
TDD Time Division Duplex
TRP transmission-reception point
TS technical specification
Tx transmitter
UAV unmanned aerial vehicle
UE user equipment (e.g., a wireless, typically mobile device)
UL uplink
UPF user plane function
VLOS visual line of sight The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Certain exemplary embodiments herein describe solutions for UAV communications in a network with receiver only mmWave 5G BS Antennas. Additional description of exemplary techniques is presented after a system into which the exemplary embodiments may be used is described. For ease of reference, the rest of this disclosure is separated into sections.

I. EXEMPLARY POSSIBLE SYSTEMS

This section concerns possible exemplary systems. First, one block diagram of a system is illustrated and then additional notes regarding other possible implementations are made.

I.1. One Exemplary System

Turning to FIG. 1, this figure shows a block diagram of one possible and non-limiting exemplary system in which the exemplary embodiments may be practiced. An unmanned aerial vehicle (UAV), a radio access network (RAN) node 170 that acts as a master node (MN), N RAN nodes 180-1 through 180-N that act as secondary nodes (SNs), and network element(s) 190 are illustrated. The radio access network (RAN) node 170 and the N RAN nodes 180-1 through 180-N form in an exemplary embodiment a set of nodes 101. That is, in an exemplary embodiment, there could be N+1 nodes 170/180 in the set of nodes 101, and the MN (RAN node 170) could be selected from this set of nodes 101. In FIG. 1, the UAV 110 is in wireless communication with a wireless communication network 100. The wireless communication network 100 is assumed to be a mmWave 5G network, but other networks are possible, e.g., in addition to this type of network. Additional description regarding other networks is presented below.

The UAV 110 is a flying vehicle that can access a wireless communication network. The UAV 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are coupled to one or more antennas 128. Note that the antennas 128 may be organized into one or more antenna panels, as described below. The one or more memories 125 include computer program code 123. The UAV 110 may be configured to perform the operations described herein such as having these operations implemented in circuitry 121, such as being implemented as part of the one or more processors 120. The operations may be implemented also as an integrated circuit in circuitry 121 or through other hardware such as a programmable gate array in circuitry 121. In another example, the operations may be implemented (in whole or part) as computer program code 123 and is executed by the one or more processors 120. For instance, the one or more memories 125 and the computer program code 123 may be configured to, with the one or more processors 120, cause the user equipment 110 to perform one or more of the operations as described herein. The UAV 110 communicates with RAN node 170 via a wireless link 111 and with the RAN nodes 180-1 through 180-N through respective wireless links 112-1 through 112-N.

The RAN nodes 170 and 180 are base stations (BSs) that, e.g., provide access for wireless devices such as the UAV 110 to the wireless network 100. These nodes may also be referred to as BSs. The RAN nodes 170 and 180 may be, for instance, a base station for 5G, also called New Radio (NR). Each RAN 170/180 may have multiple (2, 3, 5, 10, . . . ) associated TRPs, since one TRP is one antenna panel 158 in an exemplary embodiment. In the example of FIG. 1, exemplary internals of the RAN node 170 are described, and internals of the RAN nodes 180 are expected to be similar.

In 5G, the RAN node 170 may be a NG-RAN node, which is defined as either a gNB or an ng-eNB. A gNB is a node providing NR user plane and control plane protocol terminations towards the UE, and coupled via the NG interface to a 5GC (e.g., the network element(s) 190). The ng-eNB is a node providing E-UTRA user plane and control plane protocol terminations towards the UE, and coupled via the NG interface to the 5GC. There is a Transmission Reception Point (TRP) 195, which may be integral to the RAN node 170 (that is, in the same physical location) or may be remote from the RAN node 170, as illustrated in more detail below. Only one TRP 195 is illustrated in FIG. 1, but there may be multiple TRPs 195. Reference 198 illustrates a link between remote elements of the RAN node 170 and the TRP 195. In 5G, a Centralized Unit (CU) is a unit that controls one or more Distributed Units (DUs), and there is a CU 196 illustrated via dashed lines in FIG. 1. The DUs may be the TRPs 195, for instance. One definition of gNB Distributed Unit (gNB-DU) is the following: "a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU." See 3GPP TS 38.401 V15.3.0 (2018-09), "NG-RAN; Architecture description; (Release 15)". Based on this definition, and considering that the proposed additional TRPs deployed upwards do not establish new cells, as they do not transmit DL reference signals, each proposed receiver-only TRP deployed upwards may be an additional TRP of an existing DU with at least one existing conventional TRP.

The RAN node 170 may also be an eNB (evolved NodeB) base station, for LTE (long term evolution), or any other suitable base station. A remote radio head (RRH) may be implemented for the TRP 195 and eNB, for instance. Additional comments regarding possible implementations are made below.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are coupled to one or more antennas 158. The one or more memories 155 include computer program code 153. The CU 196 may include the processor(s) 152, memories 155, and network interfaces 161. Note that the TRP 195 may also contain its own memory/memories and processor(s), and/or other circuitry, but these are not shown.

The RAN node 170 (or nodes 180) is configured to perform the operations described herein, e.g., as being implemented in circuitry 151, such as being implemented as part of the one or more processors 152. The operations may also be implemented as an integrated circuit in circuitry 151 or through other hardware such as a programmable gate array in circuitry 151. In another example, the operations may be implemented as computer program code 153 and is executed by the one or more processors 152. For instance, the one or more memories 155 and the computer program code 153 are configured to, with the one or more processors 152, cause the RAN node 170 to perform one or more of the operations as described herein.

The one or more network interfaces 161 communicate over a network such as via the links 176 and 131. Two or more BSs 170, 180 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality: These are merely exemplary functions that may be supported by the network element(s) 190, and note that both 5G and LTE functions might be supported. The network element 190 is configured to perform the operations described herein, e.g., as being implemented in circuitry 174, such as being implemented as part of the one or more processors 175. The operations may also be implemented as an integrated circuit in circuitry 174 or through other hardware such as a programmable gate array in circuitry 174. In another example, the operations may be implemented as computer program code 173 and is executed by the one or more processors 175. For instance, the one or more memories 171 and the computer program code 173 are configured to, with the one or more processors 175, cause the network element 190 to perform one or more of the operations as described herein.

The RAN node 170 or RAN nodes 180 are coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UAV 110, RAN node 170, and other functions as described herein.

I.2. Additional Notes Regarding Possible Implementations

It is noted that coordination of the proposed UL beam management procedures, and the decision about which beam pairs should be used in UL, are made by the Master Node (MN) or a "network unit". The network unit in this context would be a module responsible for the beam management tasks proposed below for UAVs (e.g., see steps 2, 3, 5-8 in FIG. 6). This module could reside in the network element(s) box 190 in FIG. 1, and would be performed by circuitry 174 and/or by computer program code 173 executed by the processor(s) 175.

This disclosure focuses on a 5G network and considers that the MN is a gNB. Although being one possible implementation from the point of view of signaling in many scenarios, the MN can be any BS that is part of the cooperating set of BSs. The term "BS" or similar is used herein wherever it fits as a general term valid for a network access point (e.g. LTE or 5G BS), while terms as "gNB", "ng-eNB" and "eNB" are used only when these apply to the actual implementation being described.

For a general application, the term "Master Node" does not mean "Master Node" as in 3GPP terminology (i.e., the BS providing primary cell (PCell) access for a UE). Instead, the term MN herein has the tasks assigned to it as described herein and is characterized by the following requirements:

1) An X2/Xn connection to the other BSs composing the cooperating set of BSs to enable the inter-BS signaling proposed herein.

2) DL connection to the UAV (BS to UAV communication link) to enable the network-to-UAV signaling proposed herein.

While X2/Xn connection to the other BSs composing the cooperating set of BSs is really required to enable the signaling proposed herein, in a more general implementation, any BS that is part of the cooperating set of BSs and makes use of the inter-BS connection to another BS that has DL connection to the UAV can also be the MN, as this inter-BS connection can be used to deliver the signaling decided in the MN to the UAV via a BS that has DL connection to the UAV. Comments on the possible scenarios are below.

I.2.a. Standalone (SA) 5G

In SA 5G, we have gNBs equipped with conventional TRPs and receiver-only TRPs. A preferred MN (from signaling point of view) can be a gNB serving the UAV with a conventional TRP, as the required DL connection to the UAV is established at this network point. However, as any gNB of the cooperating set of BSs has access to the gNB serving the UAV with a conventional TRP, which includes UAV DL, then any gNB of the cooperating set of BSs can be the MN.

I.2.b. Non-Standalone (NSA) 5G

In NSA 5G, we may have gNBs equipped with conventional TRPs and receiver-only TRPs, and ng-eNBs equipped with conventional TRPs (and possibly with receiver-only TRPs too). The UAV is connected to both networks. Again, an MN (from signaling point of view) can be a gNB serving the UAV with a conventional TRP, as in the SA 5G case explained above. However, for similar reasons as in SA 5G, any gNB of the cooperating set of BSs can be the MN. When it comes to the ng-eNBs, the same conditions apply, and any ng-eNB that is part of the cooperating set of BSs can be the MN. Of course, the DL signaling delivery to the UAV will have different implementation depending on the MN.

I.2.c. LTE

The techniques presented herein are applicable to an LTE network, with different implementation from the one detailed herein, as LTE does not have beam sweeping. But multi-TRP LTE BSs and multi-panel UAVs operating in LTE can benefit from the techniques herein, to preselect BS TRP and UAV panel for connection. However, one of the main reasons to have receiver-only TRPs as described herein is to avoid interference upwards in mmWave frequency bands that will be subject to operational restrictions for protection of highly sensitive satellite services. That is not the case of LTE frequency bands (which are sub-6 GHz). In the case of frequency bands where satellite interference is not an issue, receive-only panels may still be used as a lower cost approach to improve performance of the UAV-to-RAN network links.

Having thus introduced one suitable but non-limiting technical context for the practice of the exemplary embodiments of this invention, the exemplary embodiments will now be described with greater specificity.

II. ADDITIONAL DESCRIPTION OF THE TECHNOLOGICAL AREA

Other requirements considered by 3GPP for aerial vehicles connectivity services are summarized in Table 1 (see FIG. 2) with highlights on the DL/UL data rate and C&C reliability requirements. Table 1 is a reproduced (in part) version of Table 5.1-1 in 3GPP TR 36.777, "Study on enhanced LTE support for aerial vehicles (Release 15)," December 2017.

General conclusions of the simulation-based studies in 3GPP TR 36.777 indicate that additional enhancements to mitigate interference and possibly new solutions are needed to handle a higher density of aerial UEs with higher capacity needs.

Directional antennas and/or beamforming at UAVs for transmission and reception are among the LTE enhancements identified in 3GPP TR 36.777 for reducing DL and UL interference and improving performance of terrestrial UEs and UAVs, as also shown in H. C. Nguyen, R. Amorim, J. Wigard, I. Z. Kovacs, T. B. Sorensen, P. Mogensen, "How to Ensure Reliable Connectivity for Aerial Vehicles Over Cellular Networks", IEEE Access, 2018. It is important to note that studies in 3 GPP TR 36.777 were mostly conducted for urban macro and rural environments, with BS antenna heights of 25 m and 35 m, and sub-6 GHz carrier frequency. Performance of C&C has been evaluated, with the requirement on reliability of 99.9% being achieved with 25 PRBs for UAV heights of 30 m, 50 m, 100 m, and 300 m. However, the observed UAV throughput estimates in UL (UAV to BS data transmissions) are usually far below 50 Mbps, especially in the few studies considering dense urban environment with BS antenna height of 10 m, where mean throughput in the different simulation cases roughly vary between 2 Mbps and 12 Mbps.

Numerous and relevant UAV applications are or will be based on high definition photography or film-making, then requiring high or very high data rates in UL. While connectivity for signaling and control can be achieved with current widely deployed cellular networks (i.e. LTE) and some enhancements, when it comes to high or very high data rate requirements, the Fifth Generation (5G) mobile networks operating in the millimeter wave (mmWave) spectrum and offering wider channel bandwidth becomes essential to provide high capacity communications in dense urban environments. The new 5G bands from 24 GHz to 50 GHz may be particularly good for UAV communications because of high prevalence of line of sight propagation conditions between the UAVs and base stations. However, some challenges must be overcome to enable a reliable and efficient UAV operation under mmWave 5G.

One exemplary addressed problem refers to providing reliable C&C communication and high capacity UL for VLOS and BVLOS UAVs through mmWave 5G. It should be noted that, in contrast to terrestrial consumer communications, the high throughput requirements for UAV communications is in the uplink (UAV to base station) and hence one focus of one exemplary problem addressed herein is increasing the uplink capacity. In mmWave 5G, both BS and User Equipment (UE) are equipped with antenna panels composed of multiple antenna elements that are combined to generate high gain beams towards the desired direction. While some flexibility can be assumed for the design of mmWave antennas in UAVs, outdoor mmWave 5G BSs have antenna panels generally wall mounted or deployed in lamp posts at low heights, as 6-10 m above ground level, usually down tilted to better serve most users, that are outdoors, at the ground level. This spatial configuration with low height down tilted BS antenna panels with limited range of electrical tilt in the elevation angle plane for beam steering, typically ±45°, and often far less, from the panel bore sight (center direction), lead to a limited 5G BS antenna gain above a horizon line in mmWave.

Figure 3:
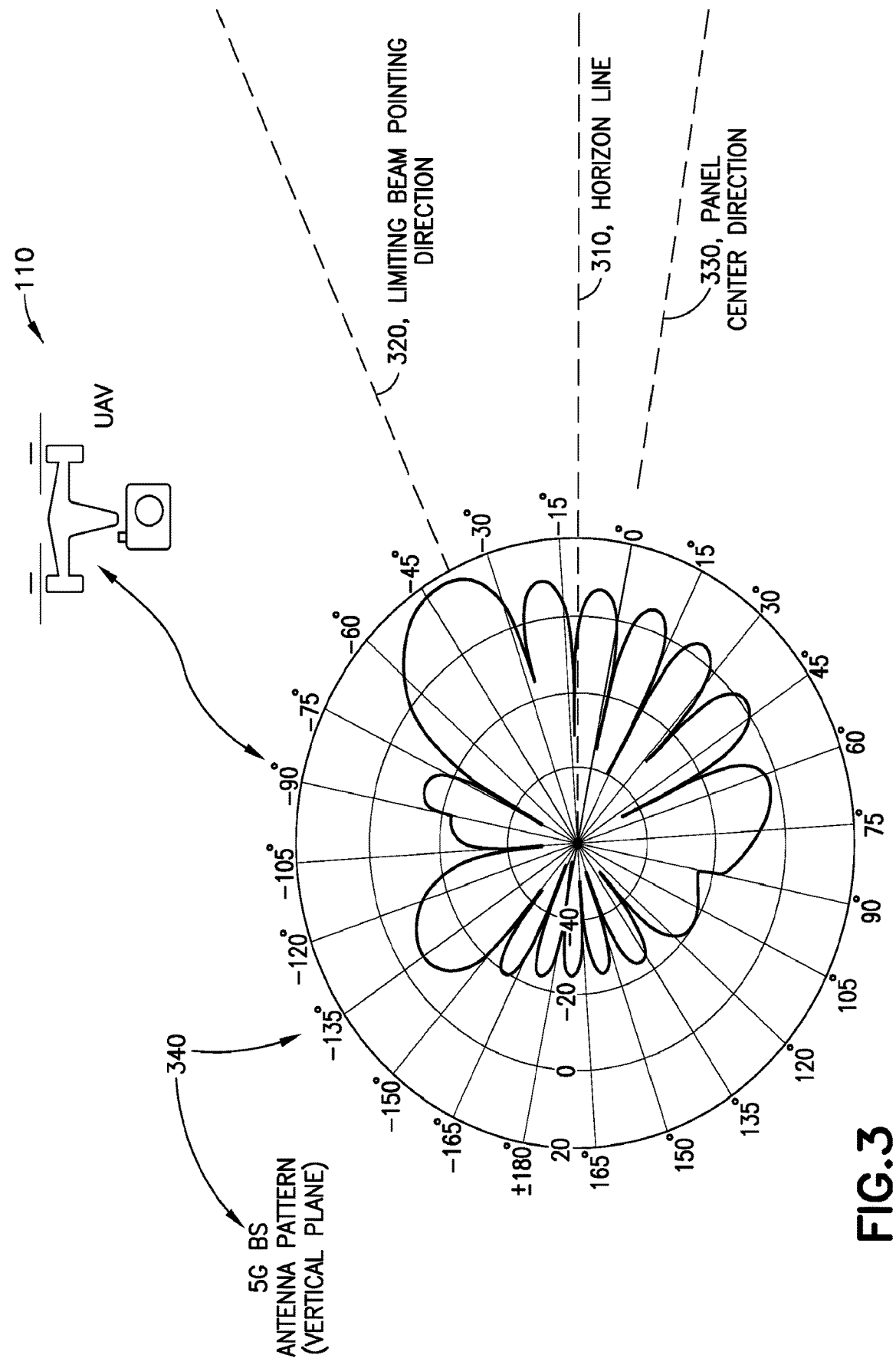
FIG. 3 illustrates a UAV and 5G BS antenna pattern in a vertical plane (best azimuth angle), with 10° (ten degree) down tilt.

FIG. 3 illustrates the vertical plane (for the best azimuth angle) of a 10° down tilted 5G antenna pattern with 8×8 antenna elements, 5 dBi gain for each antenna element, according to 5G antenna model in 3GPP TR 37.842 (see 3GPP TR 37.842, "Radio Frequency (RF) requirement background for Active Antenna System (AAS) Base Station (BS)" December 2016). The 5G BS antenna pattern 340 is shown (created from a panel at the zero position), as is a UAV 110. The limiting beam point direction 320 occurs at about 40° (40 degrees), the horizon line 310 is shown (at about 10°), and the panel center direction 330 is shown as zero degrees. The beam is steered at 45° (45 degrees) from the panel center direction, i.e., 35° above the horizon line 310, as an extreme case. As can be observed, side lobes of 5G antennas are strongly reduced when compared to the main beam gain. For example, degradations in the order of 20 dB can be observed in the BS antenna gain for elevation angle between 50° and 55° above horizon line. Antenna pattern nulls can be met depending on the azimuth and elevation angles with respect to the BS panel center (illustrated by panel center direction 330).

Figure 4:
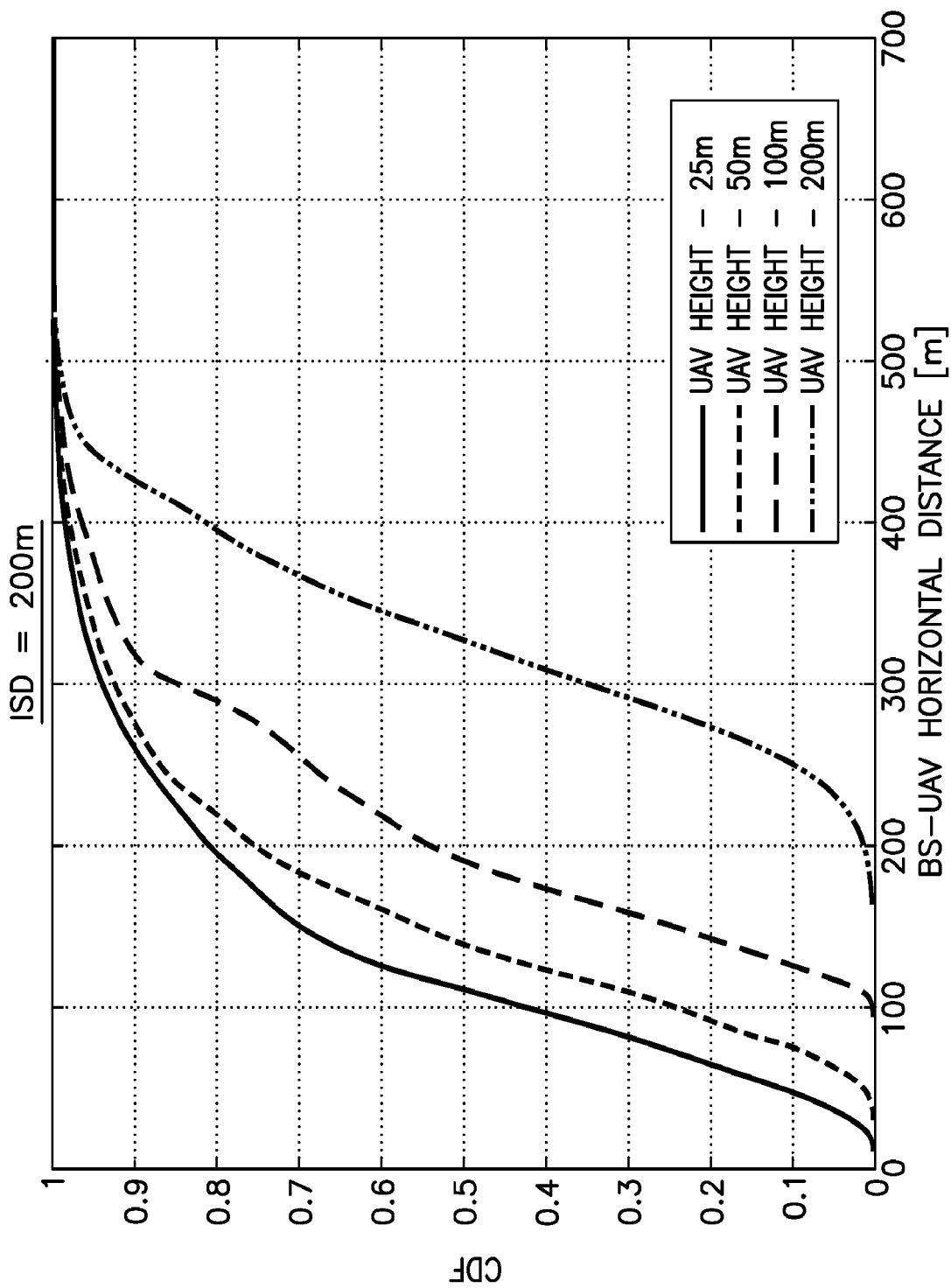
FIG. 4 is an illustration of distribution of horizontal distance between UAVs and the best serving 5G BS.

A natural consequence of the spatial configuration illustrated in FIG. 3 is that UAVs are forced to connect to far-away 5G BSs, to take advantage of the BS antenna beams with high gain. FIG. 4 shows a Cumulative Distribution Function (CDF) of the distance (BS-UAV horizontal distance, in meters) between UAVs and the best serving 5G BS (best signal level) in a cell grid with 200 m Inter Site Distance (ISD). Calculations consider Line-of-Sight (LOS) and free space path loss between the BS and UAV. Also, a 17 dBi antenna gain at the UAV is assumed from an antenna panel composed of 4×4 antenna elements with 5 dBi antenna gain each. Although having BSs available within 100 m at horizontal distances, UAVs usually connect to BSs at longer distances. It should be noted that in real-world dense urban environment the BS-UAV LOS probability is expected to be lower for low and moderate elevation angles above horizon line, and increase with the elevation angle from the BS. This brings additional challenge to the establishment and maintenance of a radio link with long BS-UAV horizontal distance.

Therefore, the limitation on the 5G BS beam steering in the vertical plane and the reduced gain of 5G BS antenna side lobes force UAVs to often connect to distant BSs instead of close ones. At the same time, distant BSs tend to offer lower LOS probability to UAVs, reducing the set of BS candidates for connection. This means low capacity UAV-BS links, especially for high UAV heights.

If mmWave 5G BSs could provide reasonable antenna gain at high elevation angles, UAVs could get better link quality and/or save energy by transmitting with lower power to nearby BSs. However, one possible improvement to provide such additional upwards antenna gain, i.e., deploying standard antenna panels or cells upwards, is not appropriate, as 5G operation in mmWave spectrum, when adopted by ITU world radio conference in 2019, is expected to be restricted by protection requirements for incumbent satellite services, both in-band and in adjacent bands.

For example, the Earth-Exploration Satellite Service (EESS), that refers to highly sensitive sensors for detecting or measuring meteorological and natural phenomena in the Earth is allocated in frequency bands as 23.6-24 GHz, 31.3-31.5 GHz, 36-37 GHz, 50.2-50.4 GHz, 52.6-54.25 GHz, and 86-92 GHz (from ITU Radio Regulations, 2015). For protection of EESS, ITU and regional regulatory bodies are considering the adoption of IMT (5G) BS unwanted emissions limits that are more stringent than the baseline limit by 20 dB or more for 5G operation in the 24.25-27.5 GHz frequency band. See the most recent technical studies in ITU regarding the frequency band 24.25-27.5 GHz (see ITU-R, Doc. 5-1/406, Annex 3, "Sharing and compatibility studies of IMT systems in the 24.25-27.5 GHz frequency range", May 2018), and the Nokia standardization internal report of the meeting (see Nokia internal standardization meeting report, "ITU-R Task Group 5/1, 5th meeting", May 2018).

As the technical studies summarized in the Nokia internal standardization meeting report and indicating challenging additional requirements to be met by 5G BSs were conducted under the assumption of 5G BSs beams steered to below horizon line directions, this operational condition or similar may be included as regulatory restriction. In Europe, the recent ECC decision (see ECC, "Harmonised technical conditions for Mobile/Fixed Communications Networks (MFCN) in the band 24.25-27.5 GHz", June 2018) regarding the frequency band 24.25-27.5 GHz already says the following:

"When deploying outdoor base stations, it shall be ensured that each antenna is normally transmitting only with main beam pointing below the horizon and in addition the antenna shall have mechanical pointing below the horizon except when the base station is only receiving".

In particular, this can be rewritten as the following: "When deploying outdoor base stations, . . . the antenna shall have mechanical pointing below the horizon except when the base station is only receiving".

Therefore, one challenge is to enable a 5G operation in mmWave that provides the required additional antenna gain upwards to serve UAVs in UL in an efficient manner, under the condition that the mmWave 5G BSs do not cause additional interference towards satellite space receivers.

Initial studies and potential/preliminary solutions for enabling UAV operation under cellular networks have been reported, e.g., in the following: H. C. Nguyen, R. Amorim, J. Wigard, I. Z. Kovacs, T. B. Sorensen, P. Mogensen, "How to Ensure Reliable Connectivity for Aerial Vehicles Over Cellular Networks", IEEE Access, 2018; G. Geraci, A. Garcia-Rodriguez, L. G. Giordano, D. Lopez-Perez, E. Bjornson, "Understanding UAV Cellular Communications: From Existing Networks to Massive MIMO", arXiv: 1804.08489v1 {cs.IT} 20 Apr. 2018; and 3GPP TR 36.777, "Study on enhanced LTE support for aerial vehicles (Release 15)," December 2017. These documents, however, refer to cellular networks operating in sub-6 GHz frequency bands, where propagation conditions, antenna characteristics and regulatory restrictions are different from mmWave. Also, UL data rates for UAVs operating in sub-6 GHz cellular networks are limited (as shown by the documents cited in this paragraph).

Regarding UAV operation under 5G cellular networks in mmWave, no solution exists that takes into account limitations imposed by the poor 5G BS antenna gain above horizon line and restrictions to transmissions with above horizon line beam steering.

In New Radio (NR) specifications, cell selection procedures for initial access or cell reselection (i.e., handover) are based on the transmission of beamformed DL reference signals by the 5G BSs (gNBs) and beamformed measurements performed by the UEs to determine the best Tx/Rx beam pair(s) (see 3GPP TS 38.300, "5G; NR; Overall description; Stage-2", September 2018, Section 9.2). Therefore, these standard procedures for initial access and handover are not applicable to receiver-only mmWave 5G BS antenna panels or Transmission Reception Points (TRPs) deployed upwards to provide additional antenna gain and high capacity for UAV UL.

In 3GPP, UL beam management is under discussion. Rel-16 working item "Enhancements on MIMO for NR" includes enhancements on multi-beam operation primarily targeting mmWave operation. Studies on UL and/or DL beam selection to reduce latency, overhead and robustness, as well as specification of UL transmit beam selection for multi-panel operation are topics to be addressed in the work item, that has not started yet.

In M. Giordani, M. Polese, A. Roy, D. Castor, M. Zorzi, "A Tutorial on Beam Management for 3GPP NR at mmWave Frequencies", submitted to the IEEE Communications Surveys and Tutorials, an overview of beam management for 3GPP NR at mmWave frequencies is presented for both initial access and tracking purposes. Besides frameworks supported by NR specifications, a "non-standalone-uplink scheme" (NSA-UL) is proposed, where the UE is primarily connected to the LTE network. The UE continuously sweeps the angular space with transmission of directional UL reference signals in mmWave, and each potential BS (e.g., serving mmWave gNB) continuously scans all its angular directions as well to monitor the received UL reference signal strength and build a report table. Once the report table of each mmWave gNB has been filled for each UE, each mmWave cell sends this information to the serving LTE eNB, that will determine the best Tx/Rx beam pair(s).

As the NSA-UL scheme in "A Tutorial on Beam Management for 3GPP NR at mmWave Frequencies" does not use DL reference signals, it could, in principle, be applied to receiver-only mmWave 5G BS antenna panels. However, continuously sweeping the whole UE angular space with transmission of directional UL reference signals and continuously scanning all angular directions by each potential serving gNB, especially in case of multi-panel UAVs, are issues due to the increased number of potential serving gNBs and possible beam pairs. Also, no mechanism is proposed in "A Tutorial on Beam Management for 3GPP NR at mmWave Frequencies" that explicitly allows UAV DL and UL to be provided by distinct cells (gNBs). The exemplary embodiments disclosed herein propose more efficient and flexible solutions.

III. OVERVIEW OF EXEMPLARY EMBODIMENTS

Methods and apparatus are proposed herein, in exemplary embodiments, to enable efficient mmWave 5G service to UAVs, e.g., requiring high or very high data rates in the UL direction (UAV to BS data transmissions), under, e.g., the condition of not causing additional interference towards above-horizon line directions.

For the apparatus, in an exemplary embodiment, the use of an additional mmWave antenna is proposed to extend the antenna capability of the standard mmWave 5G BS (e.g., a gNB), which is characterized by down tilted antenna panels with limited gain above horizon line. The proposed additional antenna array in this embodiment is deployed upwards and associated to an existing gNB and cell. It is used as a receiver-only antenna, providing appropriate BS antenna receive gain to enable high capacity and efficient UL communication between UAV and nearby mmWave 5G BS, while avoiding the generation of additional interference upwards.

Concerning an exemplary method, a beam management method is used to make the proposed receiver-only 5G BS antenna array operational, since unlike conventional/existing beam management (e.g., procedures P-1, P-2 and P-3 in 3GPP TS 38.300, Section 5.3.4):

1) Beam management involving the proposed receiver-only 5G BS antenna array should not be based on DL reference signals.

2) Beam management involving the proposed receiver-only 5G BS antenna array might not benefit from Tx-Rx beam reciprocity (even though TDD is assumed for a mmWave 5G network).

3) Beam management involving UAVs and using UL reference signals requires identification of limited set of potential serving gNBs and efficient coordination between UAVs and the potential serving gNBs, as UAV DL and UL may be better provided by distinct cells (gNBs). Especially if UAVs are equipped with multiple antenna panels, the number of possible beam pair combinations is high, and covering/evaluating all such combinations demands time, signaling, and energy.

One exemplary proposed enhanced beam management for UAV in mmWave is based on separate beam pairs (a beam pair is defined as a combination of base station beam used for transmitting/receiving to a UE and the corresponding UE beam used for receiving and transmitting) for DL and UL, with different Transmission Reception Points (TRPs) providing DL and UL to the UAV. Note that the UAV is considered to be a UE in these exemplary embodiments. The separate DL and UL may be provided by TRPs that (1) may be co-located or not, and (2) may belong to the same gNB/cell or not. An exemplary embodiment proposes an efficient Tx/Rx beam pair search and maintenance for UAV UL involving the proposed upwards receiver-only mmWave 5G BS antenna array.

The assumptions and initial conditions are as follows:

1) The UAV 110 is connected to the mmWave 5G network 100 in a conventional way, i.e., DL/UL connection with regular 5G BS antennas and beam management procedures, but at low data rates.

2) The UAV 110 may be connected to a standalone mmWave 5G network 100 or the UAV 110 can be multi-connected, i.e. also connected to a sub-6 GHz 5G network or LTE network.

3) UAV UL operation in mmWave depends on DL control channel for aspects such as synchronization, timing advance control, scheduling and HARQ ACKs. UAV UL operation in mmWave is supported by the DL control channel of the mmWave 5G; in case of multi-connectivity, UAV UL operation in mmWave may be supported by the DL control channel of the sub-6 GHz 5G or LTE network.

One exemplary proposed UL beam management follows the steps below. It is assumed below that the RAN node 170 is a serving node (an MN) and will be referred to as BS 170 and is considered to be, but does not have to be, a gNB. The RAN nodes 180 are gNB TRP candidate nodes as referred to below. It may also be that the serving BS (i.e., the BS providing radio connection to the UAV) is also the MN. However, more generally, the MN can be any BS from a cooperating set of BSs.

Step 1: The UAV 110 provides updated spatial (e.g., location and/or orientation) information to the network (e.g., the BS 170 or a network element 190), as well as antenna capability information. Update signaling from the UAV to the network can be minimized by setting the update signaling according to UAV moving characteristics change (i.e., acceleration) and network ability to predict UAV location and orientation information from available information.

Step 2: ABS 170 (e.g., as MN—Master Node) or a network element 190 determines gNB TRP candidates 180 (as SNs—Secondary Nodes) for UAV UL, based on, e.g., UAV information, TRPs information, and/or terrain/environment information. The candidate SN TRPs 180 for UAV UL may be the ones with the least coupling loss from the UAV antenna. In case of a multi-panel UAV, the correspondence between candidate gNB TRP and UAV panel is also determined. With more refinement on the location, orientation and antenna information provided by the UAV in step 1, clusters of beams or individual beams at the candidate SN TRPs and the UAV antenna panels can be determined as the best ones for search (e.g., measurement) of Tx/Rx beam pairs.

Step 3: An MN 170 or a network element 190 configures coordinated UAV Tx beam sweeping and candidate SN TRPs Rx beam measurements. Specific time-frequency resources of all cooperating candidate TRPs 180 are reserved for UL beam management. The possibly multi-panel UAV 110 has a sequence of Tx beam sweepings configured to transmit UL reference signals through the panels that point to the candidate SN TRPs determined in step 2, then potentially reducing time and signaling of beam pair search/tracking. With more refinement on the spatial information of UAV and candidate SN TRPs in steps 1 and 2, the possibly multi-panel UAV 110 has a sequence of Tx beam sweeping configured to transmit UL reference signals through clusters of beams or individual beams that point to the candidate SN TRPs determined in step 2, further reducing time and signaling of beam pair search/tracking. The candidate SN TRPs can be configured to measure UAV UL reference signals with a subset of Rx beams (e.g., a specific cluster of beams or individual beams) in the direction of the UAV.

Step 4: Candidate SN TRPs 180 report beam measurements, with information of Tx/Rx beams IDs and beam pair quality to the MN 170 or a network element 190.

Step 5: The MN 170 or a network element 190 determines the best Tx/Rx beam pair set for UAV UL based on measurement reports and load conditions of various TRPs 180. The MN 170 or a network element 190 updates the list of best Tx/Rx beam pairs.

Step 6: The MN 170 or a network element 190 makes a beam management decision. Depending on the monitored conditions and the predefined conditions for beam management, the MN 170 or a network element 190 may (a) change the Tx/Rx beam pair for UAV UL within the same gNB (L1/L2 beam management), or (b) change the SN gNB and Tx/Rx beam pair for UAV UL.

Step 7: The MN 170 or a network element 190 schedules UAV in UL with UAV Tx beam indication.

Step 8: The MN 170 or a network element 190 schedules the UAV 110 in UL with SN TRP Rx beam indication.

Step 9: The UAV 110 communicates in UL with the selected SN using the UAV Tx beam indication and the SN TRP Rx beam indication.

This coordinated UL beam management allows fast and efficient Tx/Rx beam pair search and maintenance for UAV UL, where there is a preselection of the best gNB TRPs 180, UAV panels and Tx/Rx beam pair candidates for UAV UL with basis on UAV and gNB TRPs location, antenna orientation, and/or environment morphology. UAV DL beam management and operation is independent from the UL counterpart and follows the conventional procedures,

IV. ADDITIONAL DETAILS

This section contains additional details of the exemplary embodiments.

IV.1. Apparatus and Radio Access Network Architecture

The proposed receiver-only 5G BS antenna is a new TRP in the mmWave 5G network 100. The antenna is deployed upwards and associated to an existing 5G BS (gNB) 170/180 or a cell thereof.

It is noted that description herein indicates that "cells" perform functions, but it should be clear that the base station (such as a gNB) that forms the cell will perform the functions. The cell makes up part of a gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and a gNB may use multiple carriers. Therefore, if there are three 120-degree cells per carrier and two carriers, then the gNB has a total of 6 cells.

Any type of antenna could be employed, but the best implementation in mmWave is an antenna array that can have its antenna elements combined to generate high gain beams towards the desired direction. As the purpose of the proposed antenna is to serve UAVs in LOS condition and usually nearby, where the regular 5G BS antenna presents low gain side lobes and nulls, the number of antenna elements may be the same or lower than regular mmWave 5G BS antenna panels. A lower number of antenna elements, considering that the elements provide sufficient beam gain to serve UAVs, may be beneficial to reduce the number of beam directions to span the targeted coverage area, and consequently reduce the number of beam pair combinations involving the TRP and the UAV.

Figure 5C:
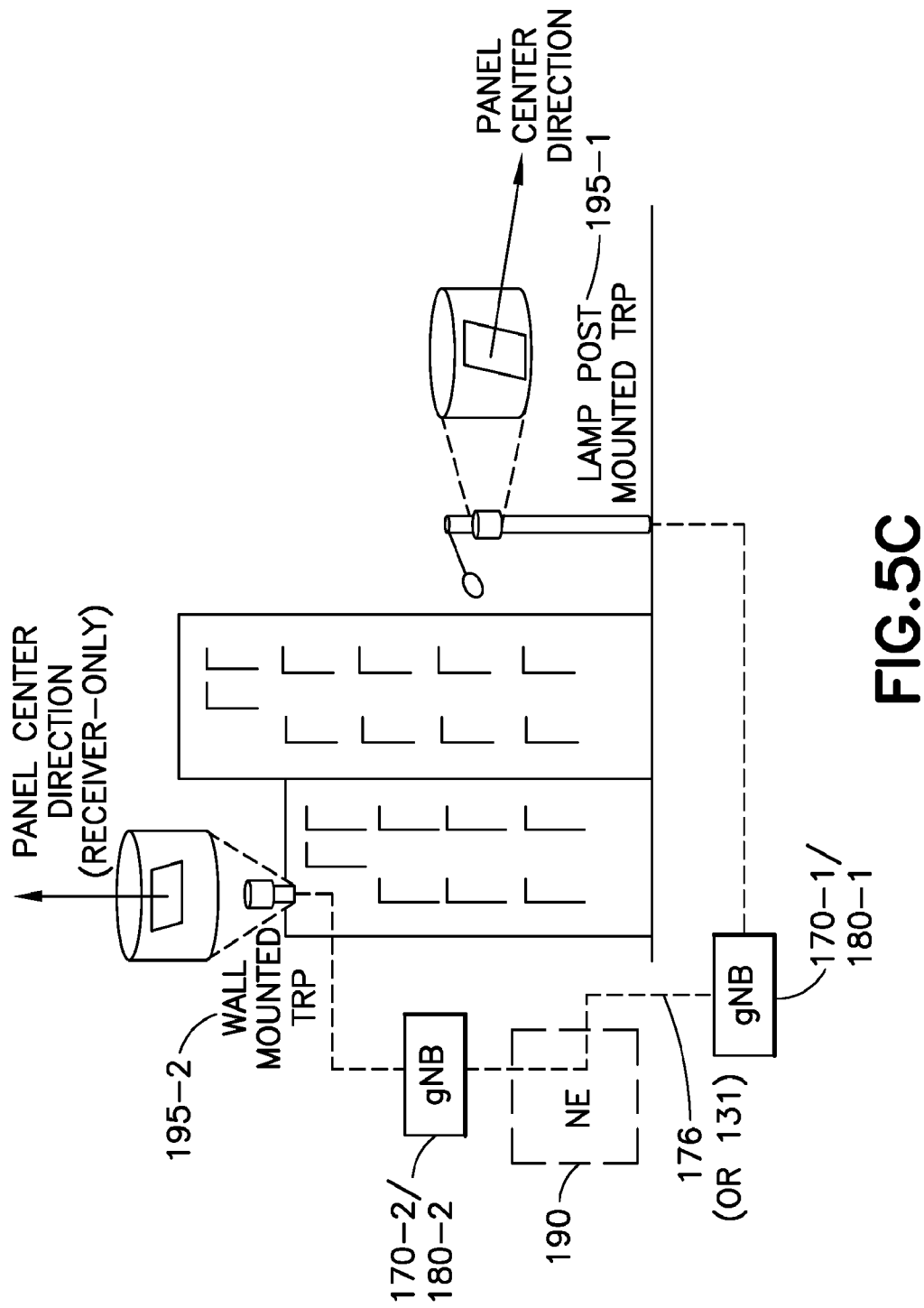
FIG. 5C illustrates an example where two TRPs, coupled to two different gNBs, are separated into two different geographical locations with a TRP with a receiver-only antennal panel and a TRP with a regular antenna panel, in an exemplary embodiment.

Exemplary implementations are shown in FIGS. 5A, 5B, and 5C. FIG. 5A illustrates an example where a set of TRPs 195, coupled to a gNB 170/180, is mounted at a single geographical location and contain both a receiver-only antenna panel 158-1 and a regular antenna panel 158-2. In an exemplary embodiment, a Transmission Reception Point (TRP) comprises an antenna array (e.g., antenna panel 158) with one or more antenna elements available to the network located at a specific geographical location for a specific area.

See also 3GPP TR 38.804 V14.0.0 (2017 March), "Study on New Radio Access Technology, Radio Interface Protocol Aspects; Release 14". FIG. 5B illustrates an example where two TRPs 195-1 and 195-2, coupled to a gNB 170/180, are separated by a longer distance and into multiple geographical locations, as a TRP 195-1 with a receiver-only antenna panel 158-1 and a TRP 195-2 with a regular antenna panel 158-2. Broadly speaking, FIGS. 5A and 5B illustrate that (1) an upward-oriented receiver-only TRP is always associated to a BS that has at least one conventional downward-oriented TRP, and (2) the receiver-only and the conventional TRPs, both associated to the same BS (e.g., gNB), could be (i) co-located (e.g., located in the same geographical location), i.e., both mounted on the same physical structure (lamp post, wall, and the like), even within the same housing, or (ii) "geographically separated" or "located in different geographical locations", i.e., mounted on different physical structures.

The proposed receiver-only TRP may be co-located in a single geographical location 510 with a regular TRP and deployed such that it illuminates a region where the regular TRP provides low gain side lobes and nulls, as in FIG. 5A. In this example, there is a lamp post-mounted set of TRP 195s coupled to a gNB 170/180 via a link 198. The set of TRPs 195 contains both a TRP 195-1 with a receiver-only antenna panel 158-1 having an upward (toward the sky, away from the ground) orientation and a TRP 195-2 having a regular antenna panel 158-2 having a panel center direction that orients toward the ground. The two TRPs 195-1, 195-2 are in the same geographical location 510 and typically within the same housing. One way to characterize this is illustrated by block 560, where the two TRPs 195-1, 195-2 are co-located, e.g., meaning in a same geographical location.

Also, the proposed receiver-only TRP may be deployed physically separated from existing regular TRPs to best serve UAVs, as illustrated in FIG. 5B, where, for example, the regular TRP 195-2 may be pole mounted (e.g., on a lamp post) at one geographical location 510-2 and have an antenna panel 158-2 that is down-tilted, while the proposed upwards TRP 195-1 may be wall mounted at another geographical location 510-1 and have an antenna panel 158-1 that orients toward the sky (away from the ground). Both TRPs 195-1, 195-2 are coupled to the gNB 170/180 via respective links 198-1, 198-2. A large distance in geographical locations 510-1, 510-2 separates the two TRPs 195-1, 195-2, e.g., at least several stories of the buildings and several buildings in width that are shown. One way to characterize this is illustrated by block 565, where the two TRPs 195-1, 195-2 are in different geographical locations. Note that the term "geographical location" can encompass latitude and longitude, but may also have a three-dimensional element involved. For instance, each of the TRPs 195-1 and 195-2 in FIG. 5B are at different vertical distances from the ground, and these vertical distances may be taken into consideration when describing the corresponding and different geographical locations 510-1 and 510-2. That is even if the two TRPs 195-1, 195-2 would be in the same vertical plane, therefore having the same latitude and longitude, the two geographical locations 510-1 and 510-2 could still be different based on their different vertical locations.

FIG. 5C illustrates another example where two TRPs 195-1, 195-2 are coupled to two different gNBs 170-1/180-1, 170-2,180-2, respectively, and also are separated into two different geographical locations. The TRP 195-1 has a receiver-only antennal panel (not shown in this figure) and is coupled to the gNB 170-1/180-1. Additionally, a TRP 195-2 has a regular antenna panel (not shown in this figure) and is coupled to the gNB 170-2/180-2. These gNBs 170/180 may communicate via link 176. Additionally or alternatively, the two gNBs 170/180 may communicate with a Network Element (NE) 190. This configuration allows cooperation between the two gNBs 170/180 (e.g., and the NE 190 if used) to carry out the operations described herein.

It is noted that a wireless communication network 100 can implement one or more (even all) of the configurations shown in FIGS. 5A, 5B, and 5C.

Figure 6:
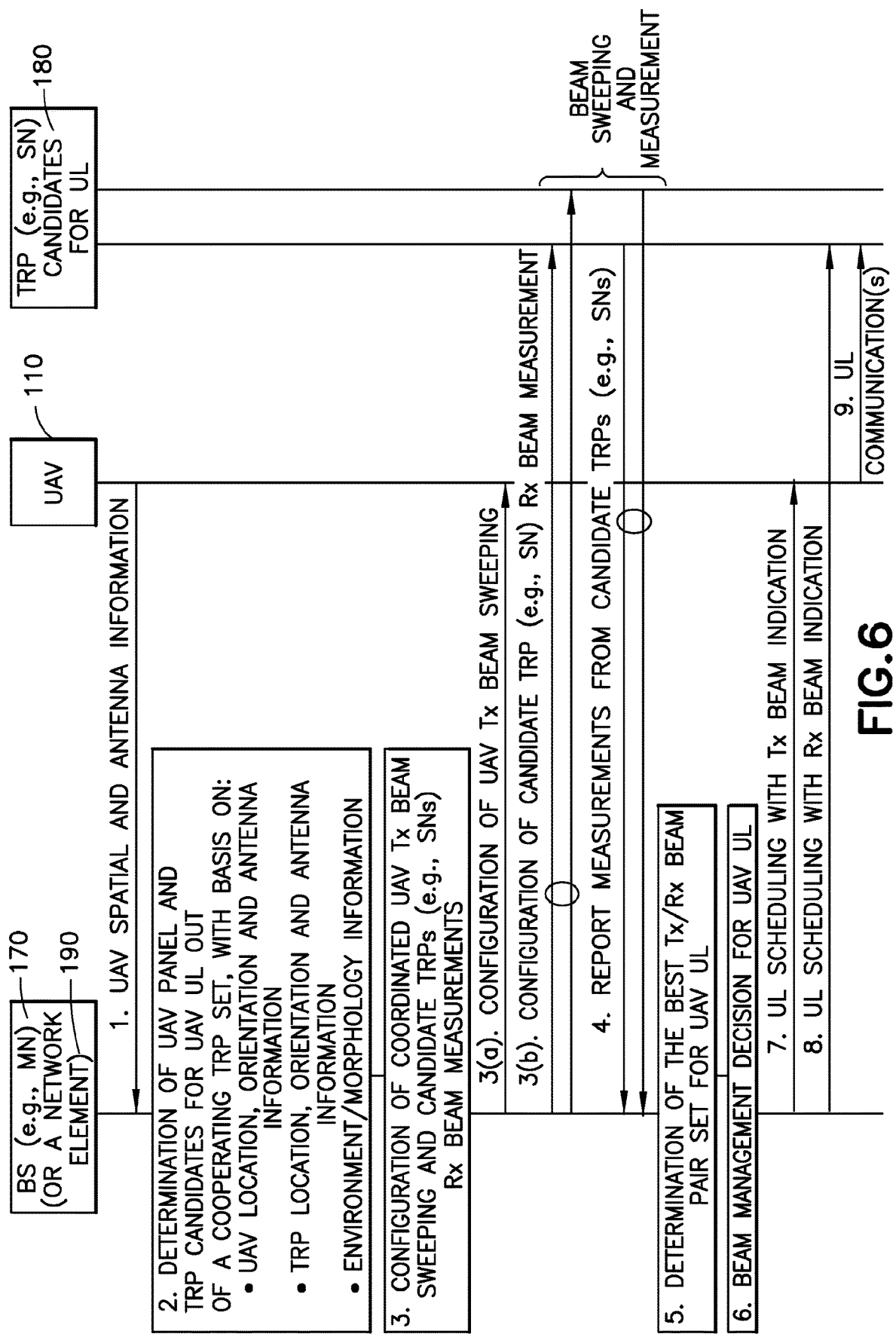
FIG. 6 is one possible proposed UL beam management scheme involving a receiver-only 5G BS antenna panel, in an exemplary embodiment.

IV.2. UL Beam Management Involving Receiver-Only mmWave TRP: Baseline Implementation Exemplary implementation of the proposed UL beam management scheme is provided in the following. The same initial conditions as stated above hold. The flowchart in FIG. 6 shows steps 1 to 9 composing one exemplary scheme. These steps add additional detail to the same steps described briefly above. FIG. 6 illustrates the operation of an exemplary method or methods, a result of execution of computer program instructions embodied on a computer readable memory, functions performed by logic implemented in hardware, and/or interconnected means for performing functions in accordance with exemplary embodiments. The BS (MN) 170 is a base station such as an eNB, gNB, and the like and operates under control, at least in part, of the circuitry 151 and/or computer program code 151 (see FIG. 1). The network element 190 operates under control, at least in part, of the circuitry 174 and/or computer program code 173 (see FIG. 1). The UAV 110 operates under control, at least in part, by instructions implemented in circuitry and/or as computer program code, as previously described. The N TRP (e.g., SN) candidates for UL are RAN nodes 180-1 through 180-N, which operate under control, at least in part, of respective circuitry 151 and/or computer program code 153 executed by the processor(s) 152.

The exemplary embodiments should be compliant with "legacy" UAVs, i.e., UAVs not equipped or configured with the proposed features (e.g., as implemented by the circuitry 121 and/or computer program code 123 executed by the processor(s) 120 in FIG. 1). For proper operation, a mmWave 5G BS 170 should be informed of this UAV capability. In the current NR specifications, UE capabilities have been updated with new parameters, such as uplinkBeamManagement, that define support of beam management for UL, including the indication of the maximum number of SRS resource sets and SRS resources per set. See the following: 3GPP TS 38.331, "5G; NR; Radio Resource Control (RRC); Protocol specification", June 2018; and 3GPP TS 38.306, "5G; NR; User Equipment (UE) radio access capabilities" (R2-1813437, agreed change request), August 2018, in Section 4.2.7.2. Then, UE capability with respect to the feature proposed in this invention can be informed as a field of uplinkBeamManagement, for instance, a Boolean spatialInformationAssistedUplinkBeamManagement, that as other UE capabilities is usually informed to the network at initial registration phase.

IV.2. Step 1

In step 1, the UAV 110 provides location, orientation, and antenna information to the BS 170 (e.g., serving mmWave 5G BS) or network element 190.

(a) UAV Spatial Information

Location and orientation information is available at the UAV 110 for C&C. This information may include periodically updated information from Inertial Navigation System (INS) and/or Global Positioning System (GPS), as, e.g., 3-dimensional position, velocity, acceleration and attitude (orientation of the UAV about its center of mass). Current commercial products provide fast update of these measures or estimates, e.g., every 5 ms (see SPG Systems, Brochure for Ellipse 2 Series, Miniature High Performance Inertial Sensors, downloaded from www.sbg-systems.com/wp-content/uploads/2018/09/Ellipse_Series_Leaflet.pdf on Nov. 15, 2018[11]). The latter document indicates that "Output rate: 200 Hz, 1,000 Hz (IMU data)" for a high performance inertial sensor. The 5 ms time update comes from output rate of 200 Hz. INSs rely on accelerometers, gyroscopes and magnetometers to measure acceleration and rotational motions or pointing directions, from which velocity and position can be obtained by mathematical integration. The combined use of INS and GPS provides greater accuracy.

It is proposed in an exemplary embodiment that UAV location and orientation information available at the UAV be provided to the BS 170 (e.g., serving mmWave 5G BS) or network element 190 for use in the beam management procedure. This can be implemented by, e.g., introducing new MAC Control Elements (CEs) that carry the mentioned information relative to the UAV and are transmitted through the UL dedicated control channel. The new MAC CEs may follow the R/F/LCID/L MAC subheader structure of NR (see 3GPP TS 38.321, "NR; Medium Access Control (MAC) protocol specification", December 2017, Section 6.1.2], where the meaning of the fields are as follows:

R: "Reserved", 1 bit; value=0.

F: "Format", 1 bit indicating the size of the field L; value=0 (size of field L is 8 bits) or value=1 (size of field L is 16 bits).

LCID: "Logical Channel ID", 6 bits indicating the control element.

L: "Length", 8 or 16 bits indicating the length of the variable-sized MAC CE in bytes.

The LCID representation with 6 bits allows 64 different MAC CEs. Only 11 are currently defined in NR for UL (see 3GPP TS 38.321, "NR; Medium Access Control (MAC) protocol specification", December 2017, Table 6.2.1-2). Below is a list of exemplary new MAC CEs relative to the UAV location and orientation.

Position: "ue-TRP-LongLatitude", "ue-TRP-LongLongitude", "ue-TRP-LongAltitude". A "short" version of these MAC CEs can be implemented by reporting the differential correction of the measures instead of absolute values.

Velocity: 3-dimensional measures, e.g. "ue-TRP-VelocityX", "ue-TRP-VelocityY", "ue-TRP-VelocityZ" in m/s.

Attitude: 3-dimensional angular rotation measures, e.g. "ue-TRP-Pitch", "ue-TRP-Roll" and "ue-TRP-Yaw" in degrees, in the local (UAV) spatial coordinate.

Angular velocity: 3-dimensional angular velocity measures, e.g. "ue-TRP-PitchVelocity", "ue-TRP-RollVelocity", "ue-TRP-YawVelocity" in rad/s or degree/s.

UAV location and orientation information may be obtained, e.g., in global spatial coordinate system (e.g. North-East-Up) or local (UAV) spatial coordinate system. Information in one coordinate system can be translated to the other, for instance with the use of rotation matrices or Euler-Rodrigues formula, that describes the rotation of a vector in three dimensions.

MAC subheader field L defines the size in bytes of each MAC CE measure, that can vary according to its accuracy and numerical representation. At least position and attitude information are required for the baseline implementation an exemplary embodiment, allowing the determination of LOS condition of a UAV antenna panel with respect to a given candidate TRP of the mmWave 5G network. With UAV velocity and angular velocity information, the network can estimate UAV location and orientation between two UAV information updates and take benefit of reduced signaling (more details in item (c)).

(b) UAV Antenna Information

Antenna information can be provided to the mmWave 5G network (e.g., network 100) as part of UAV capabilities. It may include, for each UAV panel (e.g., UAV TRP), the panel center orientation with respect to the UAV local spatial coordinate system, as well as the antenna azimuth and elevation angle ranges with respect to the UAV panel center. This can be implemented by introducing new optional RRC UE capability information elements, e.g. within uplinkBeamManagement (see 3GPP TS 38.331, "5G; NR; Radio Resource Control (RRC); Protocol specification", June 2018):

"ue-TRP-AzimuthAngleRange", "ue-TRP-ElevationAngleRange",

"ue-TRP-CenterAzimuthAngle" and "ue-TRP-CenterElevationAngle", all in degrees and usually informed to the network at initial registration phase.

(c) Spatial Information Update

The UAV-to-network signaling to update UAV location and orientation information for UL beam management can be minimized if the network can predict UAV location and orientation information from available information. An exemplary implementation is as follows:

(i) The mmWave 5G network 100 defines limits (e.g., as thresholds) for variation of 3-dimensional UAV velocity and UAV angular rotation. New optional RRC information elements, e.g. within uplinkBeamManagement (see 3GPP TS 38.331, "5G; NR; Radio Resource Control (RRC); Protocol specification", June 2018) can be introduced: "MaxDeltaVelocityX", "MaxDeltaVelocityY", "MaxDeltaVelocityZ" in m/s, and "MaxDeltaPitchVelocity", "MaxDeltaRollVelocity", "MaxDeltaYawVelocity" in rad/s or degree/s.

(ii) The UAV provides location and orientation information as described in section IV.2(a).

(iii) The UAV navigation system monitors the 3-dimensional velocity and angular velocity (e.g., or acceleration and angular acceleration or other elements of spatial information). Whenever one or more of these parameters have their variation with respect to the latest values informed to the network crossing the variation limits defined in item (i), the UAV is set to update location and orientation information as in section IV.2(a).

While the velocity and angular velocity variation limits defined in item (i) are not crossed, the network can predict/estimate UAV position and attitude by:

$$s = s_0 + v(t - t_0) \text{ and}$$

$$\theta = \theta_0 + \omega(t - t_0),$$

where s, $s_0$ and v represent, respectively, the estimated position at time t, the latest position informed to the network at time $t_0$, and the latest velocity informed to the network; the expression is separately applicable to each of the three dimensions. Similarly, $\theta$, $\theta_0$ and $\omega$ represent, respectively, the estimated angle at time t, the latest angle informed to the network at time $t_0$, and the latest angular velocity informed to the network; the expression is separately applicable to each of the three angular dimensions.

Once one or more of the variation limits (e.g., as thresholds) defined in item (i) are crossed, the UAV should in an exemplary embodiment as soon as possible update location and orientation information. For this, the UL control channel is needed. PUCCH is available for UAV in the radio link between UAV and a conventional gNB TRP, or in the radio link between UAV and the proposed receiver-only gNB TRP. In case of EN-DC, the RRC message for UAV location and orientation update can also be sent via LTE PUCCH.

Therefore, instead of a given periodic UAV-to-network signaling to update UAV spatial information, which could have a time period as short as, for instance, 5 ms, this signaling is carried out only when needed.

IV.2. Step 2

In step 2, the BS (e.g., MN) 170 or a network element 190 determines N TRP candidates 180-1 to 180-N (e.g., as SNs—Secondary Nodes) for UAV UL and the best associated UAV antenna panels, based on UAV, TRPs and environment information.

The MN 170 is part of a cooperating set of TRPs including the N TRPs 180 (e.g., the set could be MN 170 and the N TRPs 180). The MN 170 or a network element 190 with communication to the MN 170 determines the candidate SN TRPs 180 for UAV UL out of the cooperating set of TRPs with basis on one or more of the following (listed as (i)-(iii)).

(i) UAV location, orientation and antenna information (from step 1 above).

(ii) TRP location, orientation and antenna information.

This information is internal to the network, stored in gNBs or in other network elements. It comprises, for instance, TRP 3-dimensional position in a global spatial coordinate system, TRP panel center orientation, i.e., local azimuth and elevation angles of TRP panel centers, and antenna azimuth and elevation angle ranges with respect to the TRP panel centers. Then, each TRP in the cooperating set has the following associated parameters:

Position: "TRP-Latitude", "TRP-Longitude", "TRP-Altitude";

Antenna orientation: "TRP-CenterAzimuthAngle", "TRP-CenterElevationAngle"; and

Antenna capability: "TRP-AzimuthAngleRange", "TRP-ElevationAngleRange".

(iii) Environment/morphology information. Morphology information of the area where mmWave 5G TRPs 180 are deployed, e.g., building positions and sizes, can be found, e.g., in 3D maps and allow the consideration of obstructions between 5G network TRPs and the UAV for determining LOS conditions. This environment information is assumed to be available to the network, and stored in gNBs or in other network elements.

With the above-mentioned information, e.g., about the UAV position, orientation and antenna capability, the cooperating TRPs position, orientation and antenna capability, and the environment, the MN 170 or a network element 190 determines which TRPs have the UAV in their antenna LOS range and simultaneously are in the LOS range of the UAV antenna. These are primarily the candidate SN TRPs 180 for UAV UL. The UAV panels corresponding to the candidate SN TRPs for UAV UL are also determined.

Figure 7:
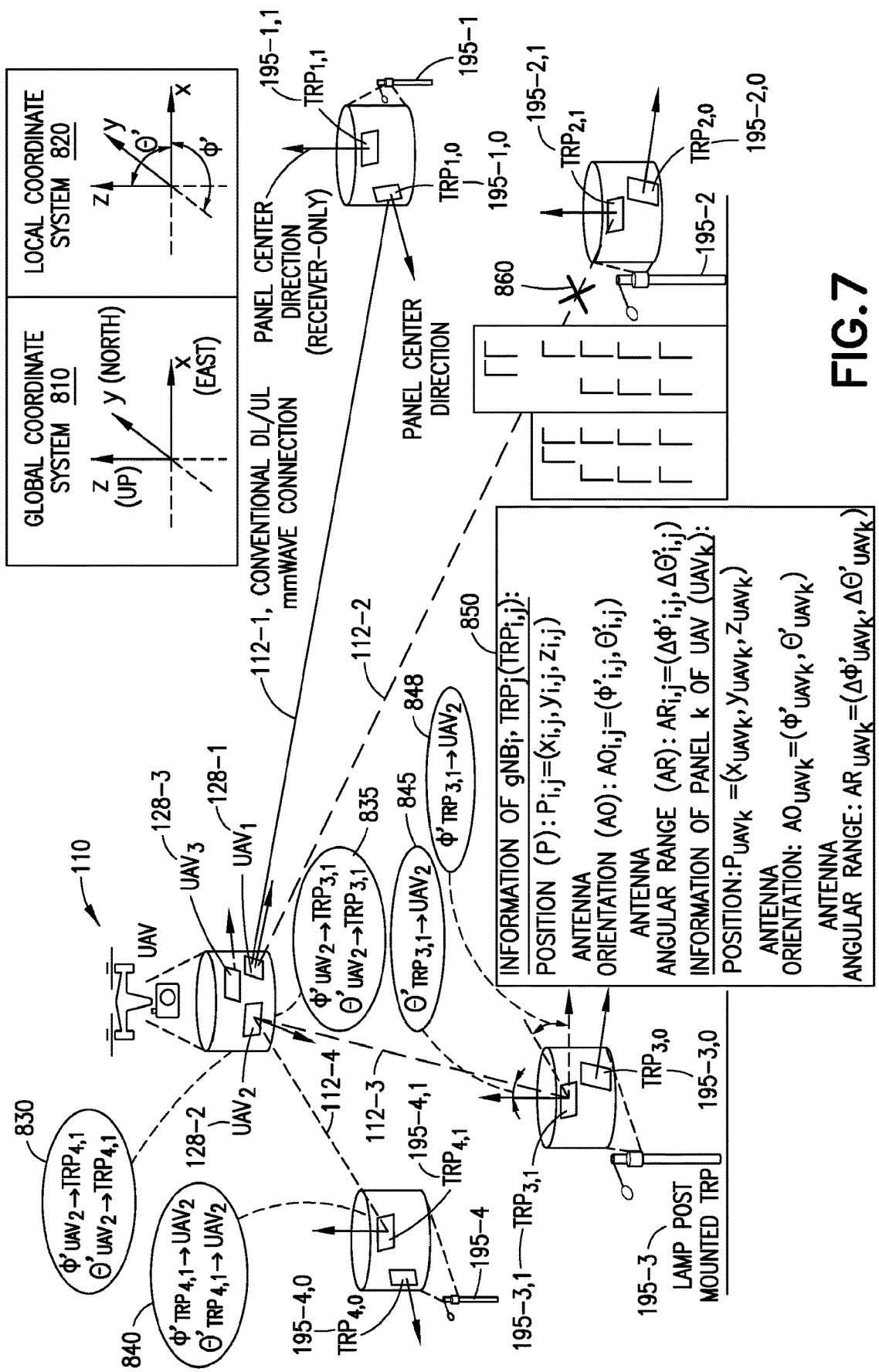
FIG. 7 is an illustrative example of deployment and parameters for candidate gNB TRP and UAV TRP determination.

FIG. 7 illustrates an exemplary mmWave 5G deployment with its elements and parameters for candidate TRP determination for UAV UL, and UAV panel correspondence. That is, FIG. 7 is an illustrative example of deployment and parameters for candidate gNB TRP and UAV TRP determination. This shows the UAV 110 with three antenna panels UAV$_1$ 128-1, UAV$_2$ 128-2 and UAV$_3$ 128-3. There are four sets of TRPs 195-1, 195-2, 195-3, and 195-4. Each of these sets of TRPs 195 has a corresponding downward-oriented antenna panel in a TRP illustrated with a zero (0) and a receiver-only panel (oriented upward and away from the ground) in a TRP illustrated with a one (1). Thus, the set of TRPs 195-1 has a downward-oriented antenna panel in TRP 195-1,0 and a receiver-only panel in TRP 195-1,1; the set of TRPs 195-2 has a downward-oriented antenna panel in the TRP 195-2,0 and a receiver-only panel in the TRP 195-2,1; the set of TRPs 195-3 has a downward-oriented antenna panel in the TRP 195-3,0 and a receiver-only panel in the TRP 195-3,1; and the set of TRPs 195-4 has a downward-oriented antenna panel in the TRP 195-4,0 and a receiver-only panel in the TRP 195-4,1. It is noted that this example has one antenna panel (shown as rectangles) per TRP 195-$i,j$. The links 112-1, 112-2, 112-3, and 112-4 between the UAV 110 and the respective TRP 195-1,0, 195-2,1, 195-3,1, and 195-4,1 are shown. A global coordinate system 810 is shown, as is a local coordinate system 820. Reference numbers 830, 835, 840, 845, 848, and 850 are described below.

Reference 850 illustrates the following known information. The information of gNB i, TRP$_j$ (which is shortened to TRP$_{i,j}$) is as follows (note that one gNB can have more than one TRP, and one TRP has one antenna panel in this example):

Position (P): $P_{i,j}=(x_{i,j},y_{i,j},z_{i,j})$;

Antenna Orientation (AO): $AO_{i,j}=(\phi'_{i,j},\theta'_{i,j})$; and

Antenna Angular Range (AR): $AR_{i,j}=(\Delta\phi'_{i,j},\Delta\theta'_{i,j})$.

The information of panel k of the UAV (UAV$_k$):

Position: $P_{UAV_k}=(x_{UAV_k},y_{UAV_k},z_{UAV_k})$;

Antenna Orientation (AO): $AO_{UAV_k}=(\phi'_{UAV_k},\theta'_{UAV_k})$; and

Antenna Angular Range (AR): $AR_{UAV_k}=(\Delta\phi'_{UAV_k},\Delta\theta'_{UAV_k})$.

Exemplary calculation steps are given below.

(a) Compute the distance between each TRP j of gNB i from the cooperating TRP set and each UAV TRP k.

$d_{TRP_{i,j}-UAV_k}=f_d(P_{i,j};P_{UAV_k})$, where $f_d$ is a function providing the Euclidian distance between two 3-dimensional positions.

(b) Compute the path loss between each TRP j of gNB i from the cooperating TRP set and each UAV TRP k:

$PL_{TRP_{i,j}-UAV_k}=f_{PL}(d_{TRP_{i,j}-UAV_k};f_c)$, where $f_c$ is the carrier frequency and $f_{PL}$ is a function providing path loss, e.g. free-space path loss.

(c) Check the LOS condition between each TRP j of gNB i from the cooperating TRP set and each UAV TRP k.

$LOS_{TRP_{i,j}-UAV_k}=f_{LOS}(P_{i,j};P_{UAV_k};AO_{i,j};AO_{UAV_k};AR_{i,j};AR_{UAV_k};EnvMap)$, where $f_{LOS}$ is an algorithm that provides as output a yes or no answer to the LOS condition of a radio link, having as input the gNB TRP and UAV TRP positions, spatial orientations and TRP capabilities in terms of azimuth and elevation angle ranges, all this in addition to information about the spatial morphology of the area, EnvMap, e.g., through 3-dimensional maps.

Algorithm $f_{LOS}$ performs, for each potential radio link between a UAV panel and a candidate gNB TRP:

(i) The computation of the azimuth and elevation angle offset from panel center at the UAV TRP, i.e.

$(\phi'_{UAV_k \to TRP_{i,j}}, \theta'_{UAV_k \to TRP_{i,j}})$, and the gNB TRP, i.e.

$(\phi'_{TRP_{i,j} \to UAV_k}, \theta'_{TRP_{i,j} \to UAV_k})$, for the establishment of that particular radio link.

Reference 830 indicates $(\phi'_{UAV_2 \to TRP_{4,1}}, \theta'_{UAV_2 \to TRP_{4,1}})$, reference 835 illustrates $(\phi'_{UAV_2 \to TRP_{3,1}}, \theta'_{UAV_2 \to TRP_{3,1}})$, and these are the azimuth and elevation angle offset from panel centers for the panel 128-2 at the UAV TRP. The reference 840 illustrates $(\phi'_{TRP_{4,1} \to UAV_2}, \theta'_{TRP_{4,1} \to UAV_2})$ which is the azimuth and elevation angle offset from panel center 195-4,1. Reference 845 illustrates $\theta'_{TRP_{3,1} \to UAV_2}$ and this elevation angle offset is illustrated diagrammatically in FIG. 7. Similarly, reference 848 illustrates $\phi'_{TRP_{3,1} \to UAV_2}$, and this azimuth angle offset is illustrated diagrammatically in FIG. 7.

(ii) The checking if spatial obstruction to the radio link exists. In FIG. 7, the cross with reference number 860 indicates that a spatial obstruction (a building) for the radio link 112-2 exists.

(iii) The checking if the azimuth and elevation angle offset from panel center at the UAV TRP, i.e., $(\phi'_{UAV_k \to TRP_{i,j}}, \theta'_{UAV_k \to TRP_{i,j}})$, and the gNB TRP, i.e.

$(\phi'_{TRP_{i,j} \to UAV_k}, \theta'_{TRP_{i,j} \to UAV_k})$, for the establishment of that particular radio link are within the UAV and gNB TRP antenna angular ranges, $AR_{UAV_k}$ and $AR_{i,j}$, respectively.

The (UAV TRP, gNB TRP) pairs are pairs that are spatially non-obstructed (from step (ii)) and pass step (iii) above. Checking is determined as in LOS condition (illustrated in FIG. 7 by the lines for references 112-3 and 112-4), and compose the set $\Omega$, represented as $\Omega = \{(\overline{UAV_k, TRP_{i,j}})\}$. Non-LOS pairs are discarded.

(d) Compute the coupling loss of the UAV-gNB pairs in LOS condition, i.e. $(UAV_k-TRP_{i,j}) \in \Omega$:

$CL_{TRP_{i,j}-UAV_k}=f_{CL}(PL_{TRP_{i,j}-UAV_k}; G_{TRP_{i,j} \to UAV_k}; G_{UAV_k \to TRP_{i,j}})$, for $(UAV_k-TRP_{i,j}) \in \Omega$, where:

$G_{TRP_{i,j} \to UAV_k}$: antenna gain of gNB TRP$_{i,j}$ in the direction of UAV$_k$, $G_{UAV_k \to TRP_{i,j}}$: antenna gain of UAV$_k$ in the direction of gNB TRP$_{i,j}$, and $f_{CL}$: function that provides coupling loss in dB by summing its logarithmic scale-valued inputs (path loss in dB and antenna gains in dBi).

(e) Determine a sorted list of TRP candidates for UAV UL and the corresponding UAV panels, i.e. (TRP$_{i,j}$, UAV$_k$) pairs, according to link quality, as below:

$(TRP_{i^*,j^*}, UAV_{k^*}) = \arg\min\{CL_{TRP_{i,j}-UAV_k}\}$, where $(UAV_k-TRP_{i,j}) \in \Omega$.

This sorted list of (TRP$_{i,j}$, UAV$_k$) pairs can take into consideration the TRP load conditions.

IV.2. Step 3

In step 3, the MN configures coordinated UAV Tx beam sweeping and candidate TRPs (e.g., SNs) Rx beam measurements. For the configuration of coordinated UAV Tx beam sweeping and candidate SN TRPs Rx beam measurements, the MN 170 or a network element 190 may reserve specific time-frequency resources of the candidate SN TRPs 180 for UAV UL determined in step 2. Reserved time-frequency resources may be periodic or aperiodic.

(a) UAV Tx Beam Sweeping

Conventional periodic, aperiodic or semi-persistent beamformed SRS configurations defined by higher layer parameters and possibly activated/changed via PDCCH (DCI or MAC CE) may be adopted.

The MN 170 or a network element 190 may determine a sequence of beamformed UL reference signals to be transmitted through UAV panels that point to candidate SN TRPs 180, following the gNB TRP to UAV TRP correspondence determined in step 2. Then, the MN 170 or a network element 190 configures UAV to transmit this sequence of beamformed SRS. Current NR signaling allows SRS transmission configuration by the gNB (see 3 GPP TR 38.802, "Study on New Radio Access Technology: Physical Layer Aspects", September 2017, Section 8.1.6.3.1).

(b) SN TRPs Rx Beam Measurements

The MN 170 or a network element 190 configures candidate SN TRPs 180 to reciprocally use Rx beams in coordination with UAV TRPs transmissions, following the gNB TRP to UAV TRP correspondence determined in step 2.

The procedure of step 3 coordinates a set of N best candidate gNB TRPs and associated UAV panels for UL beam management, where N is a small number, e.g., 3 or 5, thus reducing the time and signaling of UL Tx/Rx beam pair search/tracking.

IV.2. Step 4

Step 4 concerns candidate SN TRPs report beam measurements. In step 4, the MN 170 or a network element 190 receives measurement reports from candidate TRPs (e.g., SNs), including beam pair information as cell ID, Tx beam ID, Rx beam ID and signal quality measure.

IV.2. Step 5

In step 5, the MN 170 or a network element 190 determines the best Tx/Rx beam pair (set) for UAV UL based on measurement reports and load conditions of various TRPs. A list of best Tx/Rx beam pairs for UAV UL, possibly with different (e.g., gNB) TRPs, may be maintained and updated for each UAV.

IV.2. Step 6

In step 6, the MN 170 or a network element 190 makes beam management decisions. The proposed UL beam management scheme can be used in, e.g., intra-gNB mobility management (L1/L2 beam management) of SN and in inter-gNB mobility management (cell reselection of SN).

(a) Intra-gNB Mobility Management

The list of best Tx/Rx beam pairs for UAV UL obtained in step 5 of the proposed UL beam management scheme can be used to feed the conventional information and operational structure of intra-gNB mobility management, where beam maintenance (or tracking), i.e. Tx/Rx beam alignment within a cell is carried out with basis on the quality of monitored (measured and updated) Tx/Rx beam pairs.

(b) Inter-gNB Mobility Management

Inter-gNB mobility management refers to the change of the SN gNB. This may be related to RRC procedures as SCell release, addition and reconfiguration (see 3GPP TS 38.300, "5G; NR; Overall description; Stage-2", September 2018).

In the procedure of adding a new SCell, dedicated RRC signaling is used for sending all required system information of the SCell, i.e., while in connected mode, UEs need not acquire broadcast system information directly from the SCells when operating in CA (see 3GPP TS 38.300, Section 7.7). The situation is similar for UEs operating in DC with LTE: the gNB as the secondary node is not required to broadcast system information other than for radio frame timing and SFN. In this case, system information (for initial configuration) is provided to the UE by dedicated RRC signaling via LTE eNB. The UE acquires, at least, radio frame timing and SFN of SCG from the NR-PSS/SSS and PBCH of NR PSCell, transmitted by conventional downward-oriented antenna panel (see 3GPP TS 38.804, Section 5.5.3.1).

Therefore, UAVs 110 can take full benefit of the cell search procedure offered herein, where more and better-quality links are made available to the UAV UL due to the deployment of upwards receiver-only gNB TRPs. Also, time, signaling and energy efficient cell search is carried out (see steps 1-5 above).

IV.2. Step 7

In step 7, the MN 170 or a network element 190 schedules UAV in UL with UAV Tx beam indication. Tx beam indication is a standard procedure (see 3GPP TS 38.212, "5G; NR; Multiplexing and channel coding", July 2018, Section 7.3.1), i.e., DCI carries the spatial configuration information for PUCCH and PUSCH transmissions.

IV.2. Step 8

In step 8, the MN 170 or a network element 190 schedules the UAV 110 in UL with SN TRP Rx beam indication. The MN 170 or a network element 190 sends scheduling information to the single candidate SN TRP 180 (in the example of FIG. 6, SN TRP 180-1) determined as the best one for reception of the UAV UL. Spatial configuration for SN TRP 180 to receive the UAV transmission (Rx beam indication) is the same reported in step 4.

IV.2. Step 9

In step 9, the UL communication(s) from the UAV 110 to the selected SN TRP 180-1 is or are performed, in accordance with the scheduling from steps 7 and 8.

IV.2. More Comments Regarding the Exemplary Beam Management Scheme

Concerning the overall beam management scheme, scheduling decisions in steps 7 and 8 are made with MN and SN coordination (scheduling/beamforming coordination).

The UL beam management scheme described above may involve the proposed upwards receiver-only 5G BS antenna arrays only, or the scheme may also involve the conventional TRPs (without the upwards receiver-only antenna arrays), even recognizing that in the latter case the LOS probability between TRP and UAV is expected to be reduced. That is, conventional TRPs have the conventional beam management based on DL reference signals, as these TRPs can transmit DL reference signals. A similar proposed procedure could be applied to the conventional TRPs, which are bi-directional but could be treated as uplink-only. The benefit would not be that shown in FIGS. 9 and 10 in terms of improved SINR and reduced Tx power, but there still would be reduced time and signaling to perform beam management by preselecting good TRPs/beams for beam management.

The proposed UL beam management techniques allow a more extensive (involving multiple TRPs) and faster Tx/Rx beam pair search and maintenance for UAV UL by reducing the number of beam pairs to be evaluated by measurements due to spatial based preselection of gNB TRPs and UAV antenna panels.

IV.3. UL Beam Management Involving Receiver-Only mmWave TRP: Refined/Improved Exemplary Implementations In the baseline implementation described in Section IV.2, specific beam set information of each TRP is not taken into account. A refined/improved implementation of the UL beam management proposed herein has the same general steps as the baseline implementation in FIG. 6. While the baseline implementation improves the Tx/Rx beam pair search and maintenance for UAV UL by determining the best gNB TRPs and UAV panels for beam management, the refined/improved implementation is more granular: it determines the best cluster of beams or even individual beams for beam management at both gNB TRPs and UAV antenna panels. Below, the additions and differences to the 9-step baseline implementation (see above and FIGS. 6 and 7) are described.

IV.3. Step 1

In step 1, a UAV 110 provides location, orientation and antenna information to the BS 170 (e.g., serving mmWave 5G BS) or network element 190.

(a) UAV Location and Orientation

This is the same as the baseline implementation provided above.

(b) UAV Antenna Information

Figure 8:
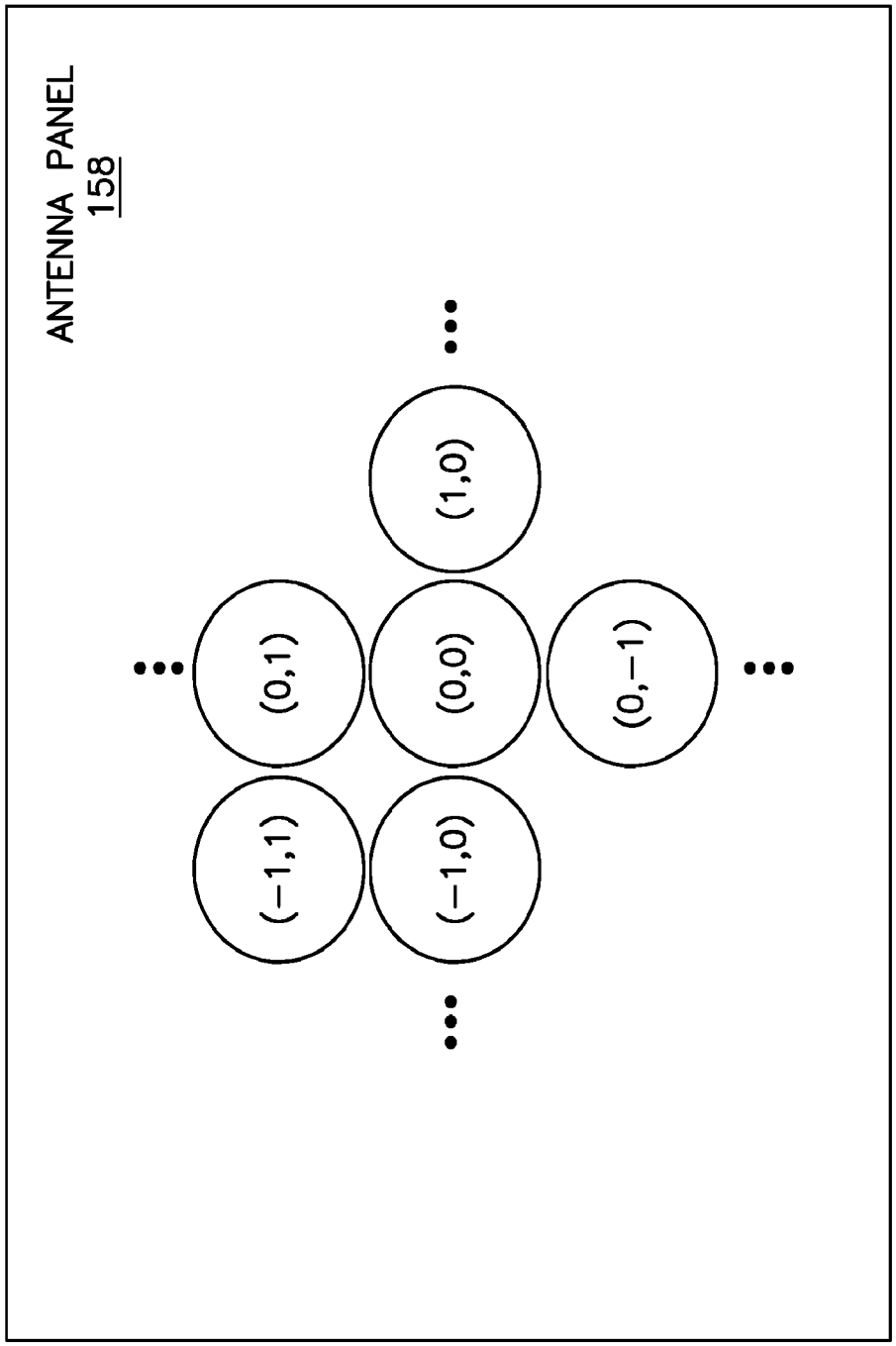
FIG. 8 illustrates beam clusters in one UAV antenna panel, in accordance with an exemplary embodiment.

In addition to the baseline antenna information provided to the mmWave 5G network as part of UAV capabilities, i.e., panel center orientation with respect to the UAV local spatial coordinate system, and antenna azimuth and elevation angle ranges with respect to the UAV panel center, more information may be needed for higher granularity. The UAV 110 may provide beam cluster labels having as reference the UAV panel center. An RRC UE capability information element within uplinkBeamManagement may be introduced, e.g., "ue-TRP-BeamClusters", where (x,y) pairs indicate the placement of the beam clusters relative to the TRP panel center. For example, (x,y)=(0,0) is the central beam cluster, and "x" indicates left(−)/right(+) from the central cluster, while "y" indicates up(+)/down(−), as illustrated in FIG. 8. FIG. 8 shows an antenna panel 158 and beam clusters in the panel.

For improving further, the UAV 110 may provide information to the mmWave 5G network of the (x,y) label to each individual UAV TRP beam, together with the beam ID (SRS ID). Implementation is similar to the case of beam clusters described above, but more granular. For this, the new RRC UE capability information element within uplinkBeamManagement would be "ue-TRP-Beams", where (x,y) pairs indicate the placement of the beams relative to the TRP panel center, similarly to FIG. 8.

IV.3. Step 2

In step 2, the MN 170 or a network element 190 determines TRP candidates (SN—Secondary Node) for UAV UL, and the best associated UAV antenna panel(s), based on UAV, TRPs and environment information.

As in the case of UAV, for more refined determination of the best gNB TRP beams in the direction of the UAV, gNB TRP beam cluster labels relative to the TRP center, similar to FIG. 8, or even individual beam labels may be used to identify TRP beam clusters or individual beams and their placement relative to the panel center.

With this refinement considered for TRPs in the 5G network 100 and/or for the UAV, the MN 170 or a network element 190 can spatially determine specific cluster of beams or specific individual beams of candidate SN TRPs 180 for UAV UL as the best ones with respect to a certain UAV, as well as specific cluster of beams or specific individual beams of UAV antenna panels as the best ones with respect to candidate SN TRPs.

This can be implemented by modifying step 2 (c)-(e) of the baseline implementation. In step 2 (c), the LOS condition checking algorithm determines candidate SN TRPs and UAV panels that are in LOS condition. The calculated azimuth and elevation angle offset from panel center at the UAV TRP in the direction of the gNB TRP, i.e., $$(\Phi'_{UAV_k \to TRP_{i,j}}, \theta'_{UAV_j \to TRP_{i,j}}),$$

and the calculated azimuth and elevation angle offset from panel center at the gNB TRP in the direction of the UAV TRP, i.e., $$(\Phi'_{TRP_{i,j} \to UAV_k}, \theta'_{TRP_{i,j} \to UAC_k}),$$

for the establishment of that particular radio link, both illustrated in FIG. 7, can be associated to the cluster of beams or individual beams spatial mapping structure illustrated in FIG. 8 to determine the specific cluster of beams or specific individual beams of both gNB TRP and UAV antenna panel. With this, instead of (UAV TRP, gNB TRP) pairs in a LOS condition, the set Ω can accommodate (UAV TRP cluster of beams, gNB TRP cluster of beams) pairs in the LOS condition, or even (UAV TRP beam, gNB TRY of beam) pairs in the LOS condition, i.e. Ω= $\{(\overline{UAV_{k,(x,y)}, TRP_{l,j(x,y)}})\}$, where the indices (x,y) correspond to the cluster of beams or the individual beam label, as illustrated in FIG. 8. The remaining steps 2 (d) and 2 (e) are then performed over the new set Ω.

IV.3. Step 3

In step 3, the MN 170 configures coordinated UAV Tx beam sweeping and candidate SN TRPs Rx beam measurements.

The only difference to the baseline implementation is that UAV Tx beam sweeping and SN TRPs Rx beam measurements can be more granular and accurate, at the level of cluster of beams or even individual beams. This means that for UAV Tx beam sweeping, the MN 170 or a network element 190 may determine a sequence of beamformed UL reference signals to be transmitted through specific UAV cluster of beams or individual beams that point to specific candidate SN TRP cluster of beams or individual beams. The MN 170 or a network element 190 may configure UAV to transmit this sequence of beamformed SRS and the corresponding SN TRPs to receive the sequence. This refined/improved implementation of step 3 reduces the time of beam pair search/tracking.

The remaining steps of the proposed UL beam management scheme, i.e. steps 4-8, are basically the same as in the baseline implementation. This more refined/granular implementation of the invention further reduces the number of beam pairs to be evaluated by measurements due to spatial based beam preselection in the gNB TRPs and in the UAV antenna panels.

IV.4. Exemplary Benefits of Receiver-Only mmWave TRP for UAV UL

Figure 9A:
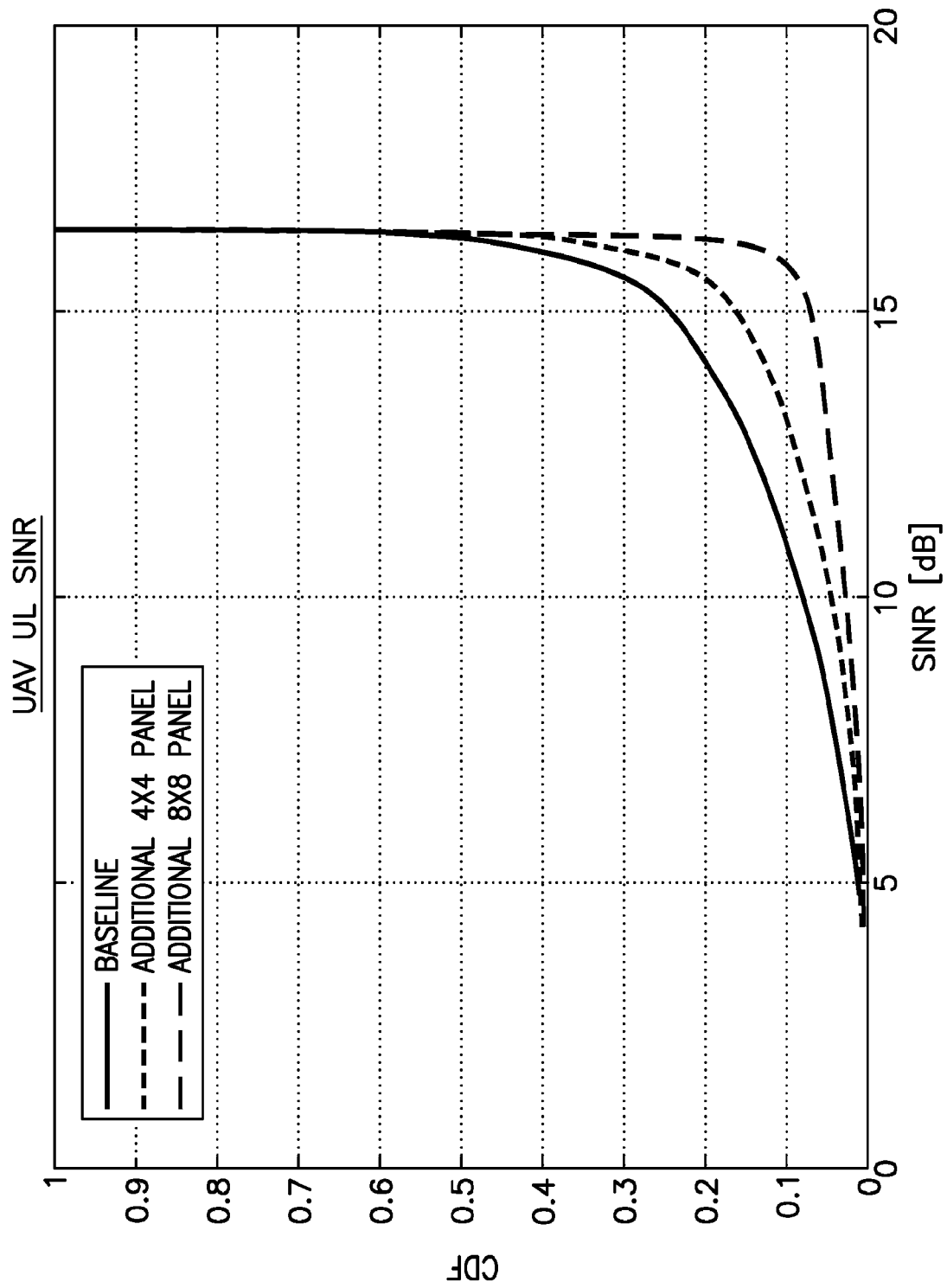
FIGS. 9A and 9B illustrate benefits of upwards receiver-only 5G BS antenna array for UAVs at 100 m height, where
Figure 9B:
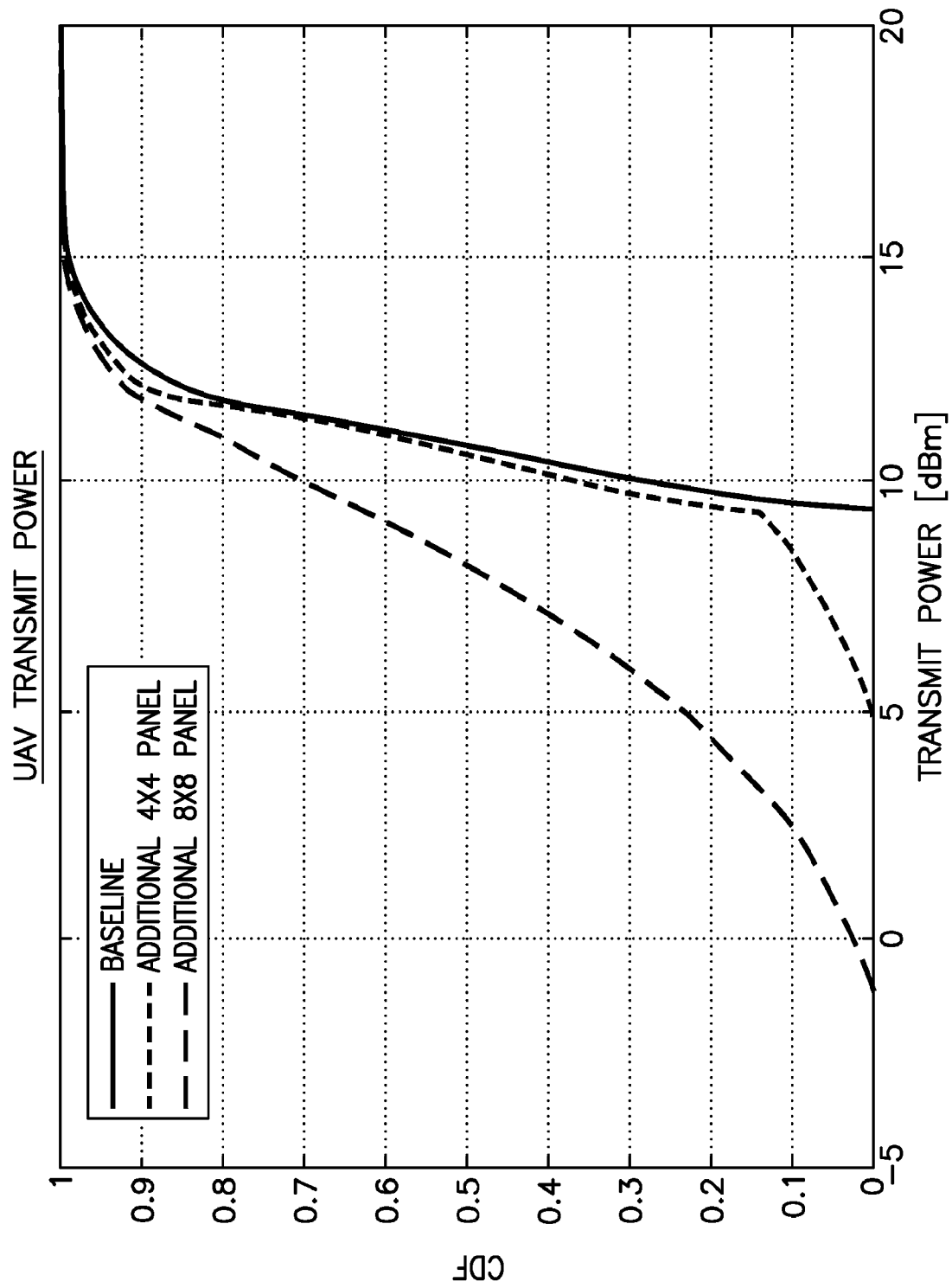

The exemplary benefits of enabling upwards receiver-only 5G BS antenna panel include those illustrated in FIGS. 9A, 9B, 10A, and 10B, where simulation results of UAV UL SINR and UAV UL transmit power are shown for UAVs at 100 m (FIGS. 9A and 9B) height and 300 m height (FIGS. 10A and 10B), respectively. FIGS. 9A and 10A illustrate UAV UL SINR and FIGS. 9B and 10B illustrates UAV transmit power. These simulations consider a cell grid with ISD of 200 m and have as baseline three TRPs (panels) per site, 10° down tilted each and covering together 360° in azimuth. BS antenna panels have 8×8 elements with 5 dBi gain each. Then, for evaluation, one additional upwards receiver-only 5G BS antenna array is considered at each existing TRP, with two configurations: 4×4 and 8×8 antenna elements. Also, a 17 dBi antenna gain at the UAV is assumed from an antenna panel composed of 4×4 antenna elements with 5 dBi antenna gain each. All antenna patterns and beam steering follow 3GPP TR 37.842 [5], and the Tx/Rx beam pair for UAV UL is the best serving one (best signal level), considering all TRPs. Every TRP has two simultaneously transmitting or receiving UEs separated in frequency. Among the simultaneously transmitting or receiving UEs, the proportion of terrestrial UEs and UAVs is the same.

UL capacity improvement and energy saving for high height UAVs, e.g., 100 m above ground level can be observed: 3-5 dB improvement in the 10th percentile of SINR (FIG. 9A) associated to energy savings (FIG. 9B) with upwards 8×8 antenna array where 80% of transmit powers are reduced by at least 1 dB and the reduction in the 50th percentile reaches 4 dB. Gains are more impressive for UAVs at higher heights, e.g., 300 m above ground level: 9-12 dB improvement in the 10th percentile of SINR (FIG. 10A) associated to energy savings (FIG. 10B) of 4-10 dB in the 50th percentile and 2.5-7 dB for the 10% less favored UAVs (those using higher transmit power).

V. FURTHER COMMENTS

In exemplary embodiments, what has been described above includes the following aspects and technical effects:

1) Upward-oriented receiver-only antenna panels to serve UAVs in UL (allowing better radio links, e.g. connection to LOS nearby BSs, and avoiding the generation of upwards interference).

2) Beam management involving upward-oriented receiver-only antenna panels

3) Preselection of a limited number of favorable TRPs for UL beam management and best associated UAV antenna panels (allowing savings in beam management signaling, energy and time with the reduction of potential Tx/Rx beam pairs).

This may include joint use of the following information to determine preselected TRPs and associated favorable UAV antenna panels:

a) UAV location (position), navigation (orientation) and antenna (azimuth and elevation angle coverage with respect to the panel center direction) information; and/or b) TRP location (position), orientation and antenna (azimuth and elevation angle coverage with respect to the panel center direction) information; and/or c) Environment/morphology information in the area (e.g., 3D maps including buildings that help to determine LOS condition between TRPs and UAVs).

4) Update of UAV related information only when needed, i.e. in the event of UAV acceleration (e.g., or velocity change) (e.g., thereby allowing reducing signaling).

5) Coordinated beam management among the preselected TRPs and the identified best UAV antenna panels.

This beam management may include Tx/Rx of UL reference signals only for the preselected TRPs and associated UAV antenna panels (in more refined cases, Tx/Rx of UL reference signals only for the preselected cluster of beams or individual beams of the preselected TRPs and associated UAV antenna panels).

As additional description, as used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining spatial and antenna information of an unmanned aerial vehicle;
   determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward;
   configuring beam sweeping to be performed for the set of candidate transmission-reception beam pairs; and
   determining, based on results of the beam sweeping, a transmission-reception beam pair of the set of candidate transmission-reception beam pairs to be used for one or more uplink communications from the unmanned aerial vehicle to a determined transmission-reception point in the determined transmission-reception beam pair.

2. An apparatus, comprising:
   at least one processor; and
   at least one memory including compute program code,
   the at least one memory and the computer program code configured, with the at least one processor, to cause the apparatus to perform operations comprising:
   determining spatial and antenna information of an unmanned aerial vehicle;
   determining, using at least the spatial and antenna information of the unmanned aerial vehicle, a set of candidate transmission-reception beam pairs, each pair between one of a set of one or more antenna panels in the unmanned aerial vehicle and one of a plurality of transmission-reception points, wherein at least one of the plurality of transmission-reception points comprises a receiver-only antenna panel that is oriented upward;
   configuring beam sweeping to be performed for the set of candidate transmission-reception beam pairs; and
   determining, based on results of the beam sweeping, a transmission-reception beam pair of the set of candidate transmission-reception beam pairs to be used for one or more uplink communications from the unmanned aerial vehicle to a determined transmission-reception point in the determined transmission-reception beam pair.

3. The apparatus of claim 2, wherein the at least one memory and the computer program code are configured, with the at least one processor, to cause the apparatus to perform operations comprising: scheduling the one or more uplink communications to be performed by the unmanned aerial vehicle to the determined transmission-reception point on the determined transmission-reception beam pair.

4. The apparatus of claim 2, wherein all of the plurality of transmission-reception points comprise a corresponding receiver-only antenna panel that is oriented upward.

5. The apparatus of claim 2, wherein at least one of the plurality of transmission-reception points is a first transmission-reception point comprising a receiver-only antenna panel that receives uplink (UL) communications only from the unmanned aerial vehicle and is coupled to a base station and wherein the base station is coupled to a second transmission-reception point comprising an antenna panel that transmits downlink (DL) communications from the base station to the unmanned aerial vehicle, wherein at least the first and second transmission points are co-located.

6. The apparatus of claim 2, wherein at least one of the plurality of transmission-reception points is a first transmission-reception point comprising a receiver-only antenna panel that receives uplink (UL) communications only from the unmanned aerial vehicle and is coupled to a base station and wherein the base station is coupled to a second transmission-reception point comprising an antenna panel that transmits downlink (DL) communications from the given base station to the unmanned aerial vehicle, wherein at least the first and second transmission points are located in different geographical locations.

7. The apparatus of claim 2, wherein at least one of the plurality of transmission-reception points is a first transmission-reception point comprising a receiver-only antenna panel that receives uplink (UL) communications only from the unmanned aerial vehicle and is coupled to a first base station and wherein at least one of the plurality of transmission-reception points is a second transmission-reception point that is coupled to a second base station, and wherein the second transmission-reception point comprises an antenna panel that transmits downlink (DL) communications from the second base station to the unmanned aerial vehicle, wherein at least the first and second transmission points are located in different geographical locations.

8. The apparatus of claim 2, wherein the determining the spatial and antenna information of the unmanned aerial vehicle is performed by receiving at least some of the spatial and antenna information of the unmanned aerial vehicle from the unmanned aerial vehicle.

9. The apparatus of claim 8, wherein the at least one memory and the computer program code are configured, with the at least one processor, to cause the apparatus to perform operations comprising: signaling the unmanned aerial vehicle to provide the spatial and antenna information periodically based on a time period indicated in the signaling.

10. The apparatus of claim 8, wherein the at least one memory and the computer program code are configured, with the at least one processor, to cause the apparatus to perform operations comprising: signaling the unmanned aerial vehicle to provide the spatial and antenna information in response to the unmanned aerial vehicle determining one or more elements of spatial information have crossed a corresponding threshold that has been defined.

11. The apparatus of claim 10, wherein the one or more elements of spatial information comprise one of the following:
   one or both of three-dimensional velocity and angular velocity; or
   one or both of acceleration and angular acceleration.

12. The apparatus of claim 2, wherein the determining the spatial and antenna information of the unmanned aerial vehicle is performed by receiving at least some of the spatial and antenna information of the unmanned aerial vehicle from a ground-based device running command and control for the unmanned aerial vehicle.

13. The apparatus of claim 2, wherein the determining a transmission-reception beam pair of the set of candidate transmission-reception beam pairs comprises checking line of sight (LOS) conditions between each candidate transmission-reception beam pair using spatial morphology of an area having the corresponding candidate transmission-reception beam pair, the spatial morphology of the area based on one or more 3-dimensional maps covering at least part of the area.

14. The apparatus of claim 2, wherein:
the antenna information comprises one or more of the following:
(1) panel center orientation with respect to a local spatial coordinate system of the unmanned aerial vehicle for the one or more antenna panels in the unmanned aerial vehicle;
(2) antenna azimuth and elevation angle ranges with respect to a corresponding panel center for the one or more antenna panels in the unmanned aerial vehicle; and
(3) (x,y) pairs indicating an (x-dimensional, y-dimensional) placement of corresponding beam clusters or individual beams relative to a panel center for the one or more antenna panels in the unmanned aerial vehicle,
wherein the antenna information comprises (1) with (2), (1) with (3), or (1) with (2) and (3); and
the configuring beam sweeping and determining a transmission-reception beam pair uses the antenna information, and wherein for (3) each of the set of candidate transmission-reception beam pairs is between one of the beam clusters or individual beams having an (x,y) pair in one of the set of one or more antenna panels in the unmanned aerial vehicle and one of a plurality of transmission-reception points.

15. The apparatus of claim 14, wherein the antenna information is received from the unmanned aerial vehicle, and the antenna information is signaled using a radio resource control (RRC) information element, where (x,y) pairs indicate the (x-dimensional, y-dimensional) placement of the beam clusters or individual beams relative to a corresponding panel center.

16. An apparatus, comprising:
at least one processor; and
at least one memory including compute program code,
the at least one memory and the computer program code configured, with the at least one processor, to cause the apparatus to perform operations comprising:
sending, by an unmanned aerial vehicle, spatial and antenna information toward a wireless communication network comprising a plurality of transmission-reception points;
receiving configuration information to configure beam sweeping to be performed for a set of candidate transmission-reception beam pairs, each pair between one of a set of one or more antenna panels in the unmanned aerial vehicle and one of a set of antenna panels in the plurality of transmission-reception points; and
performing the beam sweeping based on the received configuration information.

17. The apparatus of claim 16, wherein the at least one memory and the computer program code are configured, with the at least one processor, to cause the apparatus to perform operations comprising: receiving information that schedules one or more uplink communications to be performed by the unmanned aerial vehicle to a specific transmission-reception point on a specific transmission-reception beam pair.

18. The apparatus of claim 17, wherein the at least one memory and the computer program code are configured, with the at least one processor, to cause the apparatus to perform operations comprising: performing the scheduled one or more uplink communications by the unmanned aerial vehicle to the determined transmission-reception point on the determined transmission-reception beam pair.

19. The apparatus of claim 16, wherein:
the spatial information comprises one or more of the following:
location information of the unmanned aerial vehicle; or
orientation information of the unmanned aerial vehicle; and
the antenna information comprises one or more of the following:
for each antenna panel in the unmanned aerial vehicle a panel center orientation with respect to a local spatial coordinate system of the unmanned aerial vehicle; or
antenna azimuth and elevation angle ranges with respect to the panel center for each antenna panel in the unmanned aerial vehicle.

20. The apparatus of claim 16, wherein the sending the spatial and antenna information comprises periodically sending the spatial and antenna information according to a time period.

21. The apparatus of claim 20, wherein the one or more elements of spatial information comprise one of the following:
one or both of three-dimensional velocity and angular velocity; or
one or both of acceleration and angular acceleration.

22. The apparatus of claim 16, wherein the sending the spatial and antenna information comprises sending the spatial and antenna information in response to the unmanned aerial vehicle determining one or more elements of spatial information have crossed a corresponding threshold that has been defined.

* * * * *